(12) United States Patent
Bickham et al.

(10) Patent No.: US 8,175,437 B2
(45) Date of Patent: May 8, 2012

(54) MICROSTRUCTURED TRANSMISSION OPTICAL FIBER

(75) Inventors: Scott Robertson Bickham, Corning, NY (US); Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 44 days.

(21) Appl. No.: 12/355,178

(22) Filed: Jan. 16, 2009

(65) Prior Publication Data

US 2009/0202211 A1    Aug. 13, 2009

Related U.S. Application Data

(60) Provisional application No. 61/063,986, filed on Feb. 7, 2008, provisional application No. 61/126,608, filed on May 6, 2008.

(51) Int. Cl.
*G02B 6/02* (2006.01)

(52) U.S. Cl. .............................. 385/125; 385/123

(58) Field of Classification Search ............ 385/123, 385/125
See application file for complete search history.

(56) References Cited

U.S. PATENT DOCUMENTS

| | | | |
|---|---|---|---|
| 5,191,206 A | 3/1993 | Boiarski et al. | 250/227.14 |
| 5,802,236 A * | 9/1998 | DiGiovanni et al. | 385/127 |
| 6,614,974 B2 * | 9/2003 | Elrefaie et al. | 385/125 |
| 6,671,442 B2 * | 12/2003 | Wang et al. | 385/125 |
| 6,687,445 B2 * | 2/2004 | Carter et al. | 385/127 |
| 6,766,088 B2 * | 7/2004 | Hasegawa et al. | 385/123 |
| 6,773,825 B2 | 8/2004 | Pickrell et al. | 428/566 |
| 6,795,635 B1 * | 9/2004 | Fajardo et al. | 385/140 |
| 6,904,215 B2 | 6/2005 | Christoff et al. | 385/124 |
| 7,039,284 B2 * | 5/2006 | Nakahara | 385/125 |
| 7,054,513 B2 * | 5/2006 | Herz et al. | 385/12 |
| 7,072,552 B2 * | 7/2006 | Manyam et al. | 385/125 |
| 7,142,758 B1 * | 11/2006 | Herz et al. | 385/125 |
| 7,174,078 B2 * | 2/2007 | Libori et al. | 385/125 |
| 7,450,806 B2 * | 11/2008 | Bookbinder et al. | 385/125 |
| 7,496,268 B2 * | 2/2009 | Escoto et al. | 385/134 |
| 7,505,660 B2 * | 3/2009 | Bickham et al. | 385/125 |
| 7,526,169 B2 * | 4/2009 | Bickham et al. | 385/127 |
| 7,577,330 B2 * | 8/2009 | Beshears et al. | 385/125 |
| 7,628,548 B2 * | 12/2009 | Benjamin et al. | 385/98 |
| 2004/0069019 A1 * | 4/2004 | Carter et al. | 65/414 |
| 2005/0094954 A1 * | 5/2005 | Pickrell et al. | 385/123 |
| 2006/0034574 A1 * | 2/2006 | Guan et al. | 385/125 |

(Continued)

FOREIGN PATENT DOCUMENTS

EP    1617243 A1    3/2004

(Continued)

OTHER PUBLICATIONS

Baggett, Joanne C. et al, "Improving Bending Losses in Holey Fibers", Optical Fiber Communication Conference, 2005. Technical Digest. OFC/NFOEC, Mar. 6-11, 2005, vol. 3, 3 pp.

(Continued)

*Primary Examiner* — K. Cyrus Kianni

(74) *Attorney, Agent, or Firm* — Robert L. Carlson

(57) ABSTRACT

Microstructured optical fiber for single-moded transmission of optical signals, the optical fiber including a core region and a cladding region, the cladding region including an annular void-containing region that contains non-periodically disposed voids. The optical fiber provides single mode transmission and low bend loss.

17 Claims, 8 Drawing Sheets

U.S. PATENT DOCUMENTS

| | | | |
|---|---|---|---|
| 2007/0104437 A1* | 5/2007 | Bookbinder et al. | 385/125 |
| 2008/0131066 A1* | 6/2008 | Bickham et al. | 385/125 |
| 2008/0279515 A1* | 11/2008 | Bickham et al. | 385/123 |
| 2008/0298758 A1* | 12/2008 | Johnson | 385/123 |
| 2008/0304796 A1* | 12/2008 | Beshears et al. | 385/85 |
| 2009/0032983 A1* | 2/2009 | Bookbinder et al. | 264/1.24 |
| 2009/0060436 A1* | 3/2009 | Bickham et al. | 385/124 |
| 2009/0074023 A1* | 3/2009 | Wadsworth | 372/50.1 |
| 2009/0087150 A1* | 4/2009 | Benjamin et al. | 385/95 |
| 2009/0087151 A1* | 4/2009 | Benjamin et al. | 385/98 |

FOREIGN PATENT DOCUMENTS

| | | |
|---|---|---|
| EP | 1564569 A1 | 9/2004 |
| WO | WO02/075393 | 9/2002 |
| WO | WO02/102730 | 12/2002 |
| WO | WO2007/055881 | 5/2007 |
| WO | WO2008/005233 | 1/2008 |
| WO | WO2008/106183 | 9/2008 |

OTHER PUBLICATIONS

Ellis, Frederick P. K., "Fabrication of Random Hole Optical Fiber Preforms by Silica Sol-Gel Processing", Thesis to be submitted to Virginia Polytechnic Institute and State University, Feb. 19, 2004, 34 pp.

Guan, Ning et al, "Characteristics of field confined holey fiber analyzed by boundary element method", OFC 2002, Mar. 17-22, 2002, pp. 525-527.

Holton, Carvel et al, "Colloidal Quantum Dots Entrained in Microstructured Optical Fibers", Proceedings of SPIE, 2004, vol. 5335, pp. 258-265.

Kominsky, Daniel, "Development of Random Hole Optical Fiber and Crucible Technique Optical Fibers", Dissertation submitted to Virginia Polytechnic Institute and State University, Sep. 6, 2005, 142 pp.

Kominsky, D. et al, "Generation of random-hole optical fiber", Optics Letters, Aug. 15, 2003, vol. 23, No. 16, pp. 1409-1411.

Monro, Tanya M. et al, "Holey fibers with random cladding distributions", Optics Letters, Feb. 15, 2000, vol. 25, No. 4, pp. 206-208.

Monro, Tanya M. et al, "Holey fibers with randomly arranged air holes", Conference on Lasers and Electro-Optics, 2000. (CLEO 2000), pp. 607-608.

Monro, Tanya M. et al, "New possibilities with holey fibers", Optical Fiber Communication Conference, 2000, vol. 3, pp. 106-108.

Pickrell, Gary et al, "Fiber Optic Chemical Sensing", Proceedings of SPIE, vol. 5998, Nov. 5, 2005, 15 pp.

Pickrell, Gary et al, "Microstructural Analysis of Random Hole Optical Fibers", IEEE Photonics Technology Letters, Feb. 2004, vol. 16, No. 2, pp. 491-493.

Pickrell, Gary R. et al, "New fabrication technique for random-hold optical fibers", Proceedings of SPIE—The International Society for Optical Engineering, v 5589, Fiber Optic Sensor Technology and Applications III, Oct. 26-28, 2004, pp. 257-265.

Pickrell, Gary R. et al, "Novel Techniques for the Fabrication of Holey Optical Fibers", The International Society for Optical Engineering, v 4578, Fiber Optic Sensor Technology and Applications 2001, Oct. 30-Nov. 1, 2001, pp. 271-282.

Pickrell, G. et al, "Random-hole optical fiber evanescent-wave gas sensing", Optics Letters, Jul. 1, 2004, vol. 29, No. 13, pp. 1476-1478.

Pickrell, Gary R. et al, "Random Hole Optical Fibers", Proceedings of SPIE, Industrial and Highway Sensors Technology, 2003, vol. 5272, pp. 207-215.

Richardson, D. J. et al, "Advances in Microstructured Fiber Technology", Proceedings of 2005 IEEE/LEOS Workshop on Fibres and Optical Passive Components, Jun. 22-24, 2005, pp. 1-9.

Shinohara, Hiromichi, "Broadband Access in Japan: Rapidly Growing FTTH Market", IEEE Communications Magazine, Sep. 2005, pp. 72-78.

Wu, Tzong-Lin et al, "A Novel Ultraflattened Dispersion Photonic Crystal Fiber", IEEE Photonics Technology Letters, Jan. 2005, vol. 17, No. 1, pp. 67-69.

Y Bing et al, "Low-loss Holey Fiber", Hitachi Cable Review No. 24, Aug. 2005, pp. 1-5.

S Matsuo et al, "Bend-Insensitive and Low-Splice-Loss Optical fiber for Indoor Wiring in FTTH", Optical Fiber Communication Conference, 2004, Feb. 23-27, 2004, vol. 2, 3 pgs. with descriptive sheet attached.

* cited by examiner

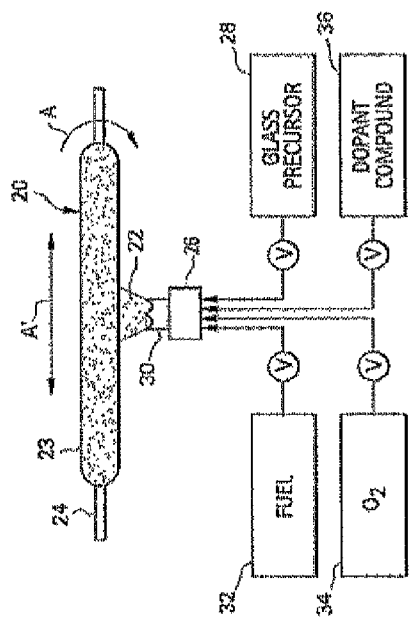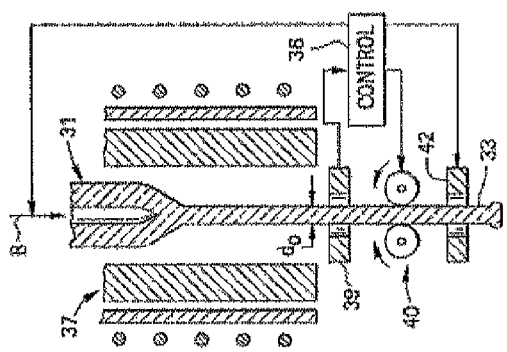

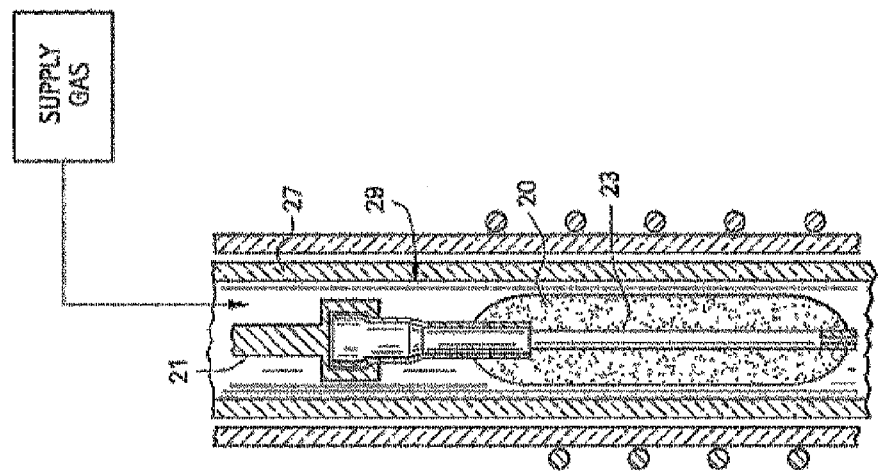

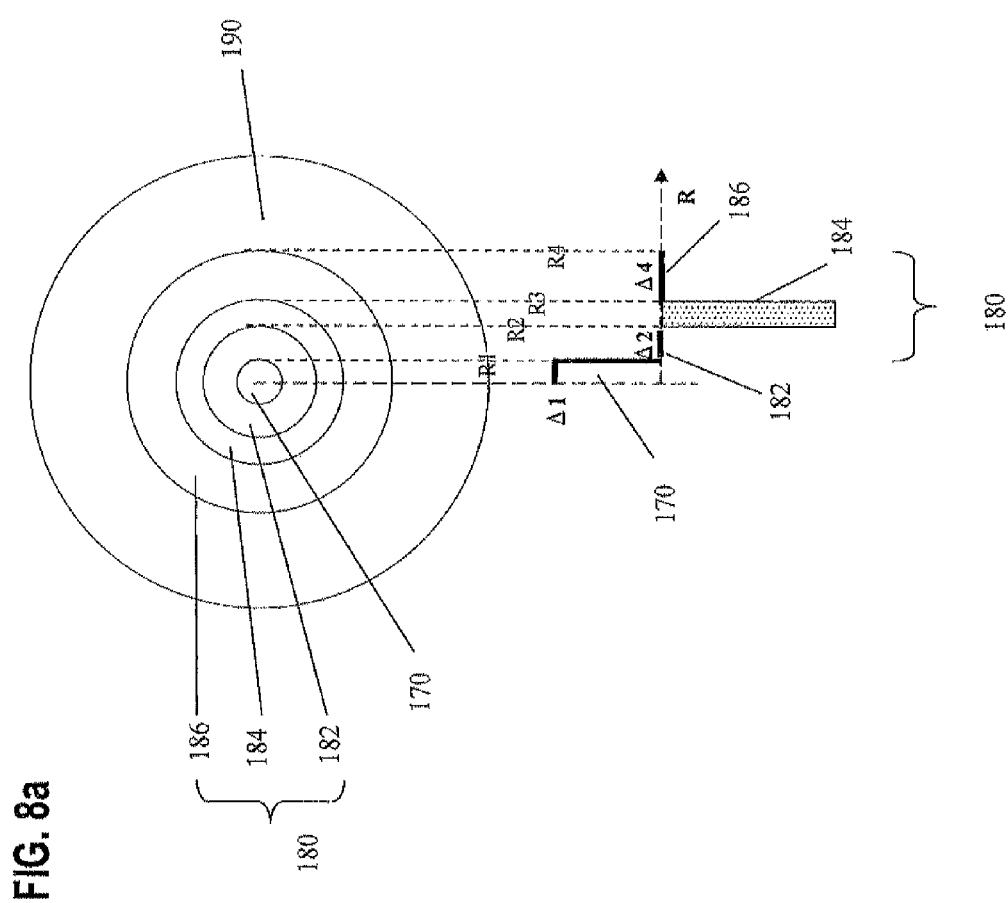

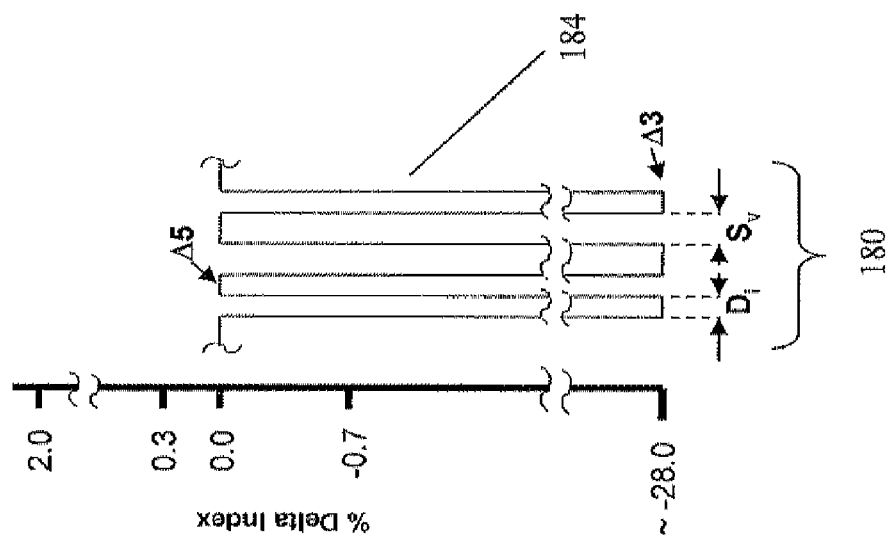

MICROSTRUCTURED TRANSMISSION OPTICAL FIBER

CROSS-REFERENCE TO RELATED APPLICATIONS

This application claims the benefit of and priority to U.S. Provisional Patent Application No. 61/063,986 filed on Feb. 7, 2008 and U.S. Provisional Patent Application No. 61/126, 608 filed on May 6, 2008 entitled, "Microstructured Transmission Optical Fiber", the content of which is relied upon and incorporated herein by reference in its entirety.

BACKGROUND OF THE INVENTION

1. Field of the Invention

The present invention relates generally to optical fibers, and more specifically to bend tolerant optical fibers that contain randomly distributed voids therein, and methods of their making.

2. Technical Background

Optical fibers formed of glass materials have been in commercial use for more than two decades. Although such optical fibers have represented a quantum leap forward in the field of telecommunications, work on alternative optical fiber designs continues. One application space for fibers which has heretofore not been successfully exploited by optical fiber is fiber to the home. However, fibers which are to be employed in buildings and homes face many challenges. A fast and low skilled installation process is vital to keep costs down, which in turn dictates the use of an optical fiber cable that handles and installs as easily as copper—and yet has no adverse affects on the optical power budget. To ensure seamless interconnection with the outdoor distribution network, it's equally important that any new fiber cable should be compatible with standard G.652 fiber, i.e. standard single mode fibers. The traditional problem for installers of optical fiber in buildings is that standard single-mode fiber cables suffer large optical losses if installed like copper cable. While more bend-tolerant fibers have existed, these fibers have not exhibited the dispersion characteristics (e.g. dispersion and dispersion slope at 1310 nm) to make them fully compatible with standard G.652 fiber.

It would therefore be desirable to develop additional bend tolerant fiber designs, particularly macrobend insensitive fibers which exhibit the dispersion characteristics similar to that of standard single mode fiber, and thus are compliant with the ITU-T G.652 standard.

SUMMARY OF THE INVENTION

One aspect of the present invention relates to a single mode microstructured optical fiber for transmitting optical signals comprised of light, the optical fiber comprising a core region disposed about a longitudinal centerline and having a refractive index profile with a first refractive index, and a cladding region surrounding the core region, the cladding region comprising an annular void-containing region comprised of non-periodically disposed voids; wherein said non-periodically disposed voids comprise a percent regional void area percent in said void-containing region which is between 2 and 6 percent, and an average number density of voids in said void-containing region is greater than 1 per microns$^2$, and said fiber exhibits a 22 meter cutoff wavelength less than 1500 nm. For example, in some embodiments the non-periodically disposed voids in the annular void-containing region may preferably comprise a percent regional void area percent in said void-containing region which is between 0.5 and 6 percent, and an average number density of voids in said void-containing region is greater than 1 per microns$^2$, and said fiber exhibits a 22 meter cutoff wavelength less than 1500 nm.

Another aspect of the invention relates to a method of making an optical fiber comprising randomly distributed voids therein, the method comprising the step of drawing said fiber from a preform comprising randomly distributed voids therein under conditions effective to result in process parameter $\Omega$ which is less than $5\times10^{-7}$, where $$\Omega = \frac{D_{gas(T_{avg})} \phi_f L_{root}}{V_f R_f^2}$$

and wherein $D_{gas}$ in cm$^2$/sec is the void gas diffusivity at $T_{avg}$, wherein $T_{avg}$ is the average of the softening point temperature of the optical fiber preform and the peak draw furnace temperature in °C., $\phi_f$ is the regional void area fraction, $L_{root}$ is the draw root length in cm as measured from the beginning of the neck down region and ending when the preform has reached the final fiber draw diameter, $V_f$ is the fiber draw speed in cm/sec and $R_f$ is the final fiber radius in cm.

The optical fiber is preferably capable of single mode transmission at one or more wavelengths in one or more operating wavelength ranges. In one preferred embodiment, the design of the core and cladding regions are selected to provide a cable cutoff wavelength less than 1310, more preferably less than or equal to 1260 nm, so that the fiber is capable of single mode transmission at 1310 nm. The optical fibers preferably provide a mode field at a wavelength of 1310 nm preferably greater than 8.0 microns, more preferably between 8.0 and 10.0 microns. Preferably, the voids are located substantially, and more preferably entirely in an annular region of the cladding of the fiber such that is spaced from and surrounds the core in a void-containing region, and the voids are preferably substantially absent from the core region, i.e., the core is preferably solid and void-free. For example, a relatively thin (e.g. having a radial width between about 1 and 10 microns, more preferably between 2 and 6 microns) ring of a void-containing region can be spaced apart from the core of the optical fiber, but not extending entirely to the outer perimeter of the optical fiber. Preferably, the void-containing ring is spaced 3 to 15 microns from the core, more preferably spaced 4 to 10 microns from the core.

While index of refraction adjusting dopants may be avoided, preferably at least one of germania or fluorine or a similar index of refraction adjusting dopant is employed together with the non-periodically distributed voids located in the cladding region of the optical fiber. In some preferred embodiments, a germania doped core is employed as the core of the optical fiber. However, use of germania and/or fluorine is not critical and, for example, the fiber could if desired be entirely or substantially devoid of both germania and fluorine.

The non-periodically disposed voids in the annular void-containing region preferably comprise a percent regional void area percent in said void-containing region which is between 2 and 6 percent. Having a regional void area percent higher than 2 percent enables a sufficiently low index of refraction relative to the core of the fiber to significantly improve macrobend performance. In other embodiments, we have found the non-periodically disposed voids in the annular void-containing region preferably comprise a percent regional void area percent in said void-containing region which is between 0.5 and 6 percent. In these embodiments having a regional void area percent higher than 0.5 percent also enables a sufficiently low index of refraction relative to the core of the fiber to significantly improve macrobend performance. We have found that incorporating a regional void area percent much higher than 6 percent can result in difficulties associated with higher order modes not being able to attenuate, and therefore it follows that such fibers would perhaps not be single moded at 1310 nm.

The non-periodically disposed voids in the annular void-containing region preferably also comprise an average number density of voids in said void-containing region greater than 0.5 per microns$^2$, more preferably greater than 1 per microns$^2$, even more preferably greater than 2 per microns$^2$, and in some embodiments greater than 5 per microns$^2$. We have found that having a higher average number density greatly improves the uniformity of bend performance along the length of the optical fiber, so that there is more consistent improved bend performance along greater lengths of the fiber.

The void-containing region also preferably comprises a void distribution uniformity throughout the circumference and width of the annular void-containing region and along the length of the fiber sufficient to result in a maximum bend loss less than 2 dB per 10 mm diameter turn for an entire fiber length which is greater than 1 m, more preferably greater than 2 m, and even more preferably greater than 100 m, and most preferably greater than 10 km. More preferably, the void-containing region comprises a void distribution uniformity throughout the circumference and width of the annular void-containing region and along the length of the fiber sufficient to result in a maximum bend loss less than 1 dB per 10 mm diameter turn for an entire fiber length which is greater than 1 m, more preferably greater than 2 m, and even more preferably greater than 100 m, and most preferably greater than 10 km. Even more preferably, the void-containing region comprises a void distribution uniformity throughout the circumference and width of the annular void-containing region and along the length of the fiber sufficient to result in a maximum bend loss less than 0.5 dB per 10 nun diameter turn for an entire fiber length which is greater than 1 m, more preferably greater than 2 m, and even more preferably greater than 100 m, and most preferably greater than 10 km.

To facilitate achieving a higher average number density, the annular void-containing region comprises greater than 100 voids when said fiber is viewed in cross-section, more preferably greater than 200 voids when said fiber is viewed in cross-section, even more preferably greater than 400 voids when said fiber is viewed in cross-section, and most preferably greater than 600 voids when said fiber is viewed in cross-section. In fact, the techniques disclosed herein are sufficient to result in greater than 1000, and even greater than 2000 voids in the annular ring of the fiber, even for annular rings which have a width of less than 10, and more preferably less than 7 microns (e.g., radial width of between 1 to 7 microns).

Non-periodically disposed voids can be formed in the annular void-containing region by using consolidation techniques which cause the glass in the region to have voids or voids trapped during the consolidation process. We have found that the higher numbers of voids and higher regional void area percents described above can be simultaneously achieved by consolidating the glass region under conditions sufficient to result in these numbers and regional void area percents of voids. In particular, we have found that these results can be facilitated by employing a consolidation step during which the consolidation gas atmosphere comprises either (1) krypton gas or sulfur dioxide gas or (2) chlorine plus at least one of nitrogen, carbon dioxide, or sulphur dioxide, argon or krypton. Preferably, if nitrogen, carbon dioxide, argon, krypton and/or sulphur dioxide are employed as a consolidation gas during the non-periodic void forming step, the amount of chlorine employed in either the drying step or the void forming consolidation step is sufficient to result in greater than 2000 ppm by weight, more preferably greater than 3000 ppm by weight, and in some embodiments the Cl can be greater than 10,000 ppm by weight, being retained within the glass region of the annular void-containing ring region of the optical fiber. A drying gas to remove OH from the soot preform prior to consolidation can comprise $Cl_2$, CO, $COCl_2$, or $SiCl_4$.

We have found that, by employing the higher number of voids and higher regional void area percents described above, it is possible to achieve void distribution uniformities throughout the circumference and width of the annular void-containing region and along the length of the fiber sufficient which result in a maximum bend loss less than 2 dB per 10 mm diameter turn, more preferably less than 1 dB per 10 mm diameter turn, and most preferably less than 0.5 dB per 10 mm diameter turn, for an entire fiber length which is greater than 1 in, more preferably greater than 2 m) and even more preferably greater than 100 m, and most preferably greater than 10 nm.

In some embodiments, the microstructured optical fiber disclosed herein comprises a core region disposed about a longitudinal centerline, and a cladding region surrounding the core region, the cladding region comprising an annular void-containing region comprised of non-periodically disposed voids, wherein the annular void-containing region has a maximum radial width between 2 and 10 microns and the annular void-containing region has a regional void area percent between 2 and 10 percent. The non-periodically disposed voids have a mean diameter of less than 500, preferably less than 300 and more preferably less than 200 nm and greater than 5 nm. In some embodiments the non-periodically disposed voids have a mean diameter of less than 100 nm and greater than 2 nm. In some embodiments the non-periodically disposed voids have a mean diameter of less than 50 nm and greater than 2 nm.

By "non-periodically disposed" or "non-periodic distribution", we mean that when one takes a cross section (such as a cross section perpendicular to the longitudinal axis) of the optical fiber, the non-periodically disposed voids are randomly or non-periodically distributed across a portion of the fiber. Similar cross sections taken at different points along the length of the fiber will reveal different cross-sectional void patterns, i.e., various cross sections will have different void patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than a few meters, and in many cases less than 1 meter along the length of the fiber. The terms voids and seeds are used herein interchangeably.

Spacing the void-containing region (void-containing ring or intermediate annular region) apart from the core assists in lowering the attenuation of the optical fiber 1550 nm. Additionally, limiting the width of the void-containing region facilitates single mode transmission within the optical fiber.

The fibers disclosed herein can be made using a relatively low cost manufacturing process, because expensive dopants such as fluorine and/or germania can be avoided in the void-containing region, if desired, and the stack and draw manufacturing process of arranging spatially periodically disposed voids in the glass part of the optical fiber can likewise be avoided, if desired. Alternatively, the methods disclosed herein can be used simply to add voids or voids to a cladding of a fiber which is doped with one or more of germania, phosphorous, aluminum, ytterbium, erbium, fluorine or other conventional fiber dopant materials, or which also contains spatially periodically disposed voids in the cladding, to increase the bend resistance thereof. In some embodiments disclosed herein, the optical fiber contains no, or essentially no, fluorine or boron.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 1 illustrates an OVD method for forming a soot preform.

FIG. 2 illustrates a cross-sectional side view of a consolidation process in accordance with the invention.

FIG. 3 illustrates a redraw process for forming a core cane.

FIGS. 8a and 8b schematically illustrates a cross-section of an optical fiber made in accordance with the invention, shown with a coating.

DETAILED DESCRIPTION OF THE PREFERRED EMBODIMENTS

Figure 4:
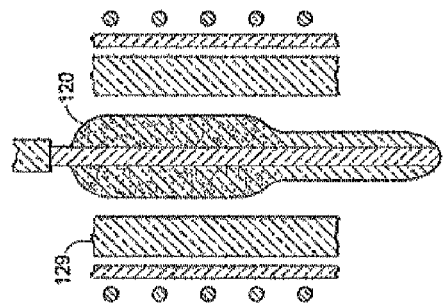
FIG. 4 illustrates consolidation of soot which has been deposited onto a core cane.

Optical fiber disclosed herein can be made using the methods described below which utilize preform consolidation conditions which are effective to result in a significant amount of gases being trapped in the consolidated glass preform, thereby causing the formation of voids in the consolidated glass optical fiber preform. Rather than taking steps to remove these voids, the resultant preform is used to form an optical fiber with voids, therein. As used herein, the diameter of a void is the longest line segment whose endpoints are disposed on the silica internal surface defining the void when the optical fiber is viewed in perpendicular cross-section transverse to the longitudinal axis of the fiber.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the refractive index of pure (undoped) silica. The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the α-profile, $r_f$ is the final point of the α-profile, and α is an exponent which is a real number.

Fiber cutoff wavelength as used herein is measured by the standard 2 m fiber cutoff test, FOTP-80 (EIA-TIA-455-80), to yield the "fiber cutoff wavelength", also known as the "2 m fiber cutoff" or "fiber cutoff".

Cable cutoff wavelength as used herein is measured by the standard 22 m cable cutoff test, FOTP-170 (EIA-455-170), to yield the "cable cutoff wavelength", also known as the "22 m cutoff wavelength" or "cable cutoff".

The mode field diameter (MFD) is measured using the Peterman II method wherein, $2w = MFD$, and $w^2 = (2\int f^2 r \, dr / \int [df/dr]^2 r \, dr)$, the integral limits being 0 to ∞. All optical properties (such as dispersion, dispersion slope, bending, etc.) are reported herein at a wavelength of 1550 nm unless otherwise noted.

During the manufacture of transmission optical fibers by conventional soot deposition processes such as the outside vapor deposition (OVD) process or the vapor axial deposition (VAD) process, silica and doped silica particles are pyrogenically generated in a flame and deposited as soot. In the case of OVD, silica soot preforms are formed layer-by-layer by deposition of the particles on the outside of a cylindrical target rod by traversing the soot-laden flame along the axis of the cylindrical target. Such porous soot preforms are subsequently treated with a drying agent (e.g., chlorine, CO, $COCl_2$, or $SiCl_4$) to remove water and metal impurities and are then consolidated or sintered into glass preforms at temperatures ranging from 1100-1500° C. Surface energy driven viscous flow sintering is the dominant mechanism of sintering, which results in densification and closing of the pores of the soot, thereby forming a consolidated glass preform. During the final stages of sintering, the gases used in consolidation may become trapped as the open pores are closed. If the solubility and permeability of the trapped gases in the glass are high at the sintering temperature, then the gases are able to migrate through and out of the glass during the consolidation process. Alternatively, gases which are still trapped after the consolidation phase of the fiber manufacturing process may be outgassed by holding the fiber preforms for a period until the gases migrate out through the glass preforms, thereby leaving one or more voids with vacuum therein within the preform. During the draw operation when the optical fiber is drawn from the preform, these voids close, leaving a void-free or essentially void-free optical fiber. In consolidation processes which are employed to make conventional transmission optical fiber, the goal is to achieve an optical fiber that is entirely free of voids in both the core and cladding region of the optical fiber. Helium is often the gas utilized as the atmosphere during the consolidation of conventional optical fiber preforms. Because helium is very permeable in glass, it very easily exits the soot preform and the glass during the consolidation process, so that after consolidating in helium the glass is free of pores or voids.

The optical fiber disclosed herein is made from a preform that was subjected to preform consolidation conditions which are effective to result in a significant amount of gases being trapped in a region of the consolidated glass preform, thereby causing the formation of non-periodically distributed voids in the void-containing region of the consolidated glass optical fiber preform. Rather than taking steps to remove these voids, the resultant preform is purposefully used to form an optical fiber with voids therein. In particular, by utilizing relatively low permeability gases and/or relatively high sintering rates, voids can be trapped in the consolidated glass during the consolidation process. The sintering rate can be increased by increasing the sintering temperature and/or increasing the downfeed rate of the soot preform through the sintering zone of the consolidation furnace. Under certain sintering conditions, it is possible to obtain glasses in which the area fraction of the trapped gases is a significant fraction of the total area or volume of the preform.

In the optical fiber disclosed herein, the non-periodically distributed voids which are present in the optical fiber as a result of using the processes disclosed herein are located in the cladding of the optical fiber. Such voids can be used to lower refractive index. By utilizing the consolidation parameters so that the maximum diameter of the voids or voids is less than the wavelength of the light which is to be transmitted along the length of the fiber (e.g. in the case of optical fibers for use in telecommunications applications, less than 1550 nm), the fiber may be effectively used to transmit information at a particular wavelength.

FIG. 1 illustrates a method of manufacturing a soot optical fiber preform 20 which can be used to make the optical fiber disclosed herein. In the embodiment illustrated in FIG. 1, soot preform 20 is formed by depositing silica-containing soot 22 onto an outside of a rotating and translating mandrel or bait rod 24. This process is known as the OVD or outside vapor deposition process. Mandrel 24 is preferably tapered. The soot 22 is formed by providing a glass precursor 28 in gaseous form to the flame 30 of a burner 26 to oxidize it. Fuel 32, such as methane (CH4), and combustion supporting gas 34, such as oxygen, are provided to the burner 26 and ignited to form the flame 30. Mass flow controllers, labeled V, meter the appropriate amounts of suitable dopant compound 36 silica glass precursor 28, fuel 32 and combustion supporting gas 34, all preferably in gaseous form, to the burner 26. The glass former compounds 28, 36 are oxidized in the flame 30 to form the generally cylindrically-shaped soot region 23. In particular, a dopant compound 36 may be included if desired. For example, a germanium compound may be included as an index of refraction increasing dopant (e.g. in the core of the fiber), or a fluorine containing compound may be included to lower the index of refraction (e.g. in the cladding and/or void-containing region of the fiber).

As illustrated in FIG. 2, the soot preform 20 including the cylindrical soot region 23 may be consolidated in a consolidation furnace 29 to form a consolidated preform 31 (shown in subsequent FIG. 3). Prior to consolidation, the mandrel 24 illustrated in FIG. 1 is removed to form a hollow, cylindrical soot preform. During the consolidation process, the soot preform 20 is suspended, for example, inside a pure quartz muffle tube 27 of the furnace 29 by a holding mechanism 21. Preferably, before the consolidation step the preform 20 is exposed to a drying atmosphere. For example, a suitable drying atmosphere may include about 95 percent to 99 percent helium and 1 percent to 5 percent chlorine gas or CO gas at a temperature of between about 950° C. and 1250° C. and a suitable drying time ranges from about 0.5 and 4.0 hours. The soot preform can also be doped, if desired, for example using a dopant gas having fluorine or other optical fiber dopants therein. For example, to dope with fluorine, $SiF_4$ and/or $CF_4$ gas may be employed. Such dopant gases may be employed using conventional doping temperatures, for example between about 950 and 1250° C. for 0.25 to 4 hours.

During the void trapping consolidation step, which preferably takes place after a soot drying step, the furnace temperature is raised and the preform 20 is consolidated at a suitable temperature, for example between about 1390° C. and 1535° C. to form a consolidated preform. Alternatively, and more preferably, gradient sintering may be employed whereby the soot preform 20 is driven down through a hot zone of the furnace 29 which is maintained at a temperature of between about 1225° C. to 1550° C., more preferably between about 1390° C. and 1535° C. For example, the preform may be held in an isothermal zone which is maintained at a desired drying temperature (950-1250° C.), after which the soot preform is driven through a zone which is maintained at a desired consolidation temperature (e.g. 1225° C. to 1550° C., more preferably 1390° C. and 1535° C.) at a rate of speed which is sufficient to result in the preform 20 temperature increasing by greater than 1° C./min. Upper zones of the furnace can be maintained at lower temperatures which facilitate a drying and impurity removal step. The lower zone can be maintained at the higher temperatures desired for consolidation. In one preferred embodiment, the soot containing preform is downfed through a consolidation hot zone at a first downfeed rate, followed by downfeeding of the preform through a second hot zone at a second downfeed rate which is less than that of the first downfeed rate. Such a consolidation technique results in the outside portion of the soot preform sintering before the rest of the preform sinters, thereby facilitating trapping of gases which will in turn facilitate formation of and retaining of voids in the resultant consolidated glass. For example, the preform can be exposed to such suitable consolidation temperatures (e.g. greater than about 1390° C.) at a first speed which is sufficient to result in the preform temperature increasing by more than 15° C./min, more preferably greater than 17° C./min, followed by at least a second downfeed rate/consolidation temperature combination which is sufficient to result in the preform heating by at least about 12° C./min, more preferably greater than 14° C./min. Preferably, the first consolidation rate results in the outside of the preform increasing in temperature at a rate which is greater than 2, more preferably greater than 3, and most preferably greater than about 4° C./min higher than the heating rate of the second consolidation rate. If desired, a third consolidation step can be employed which heats at a slower rate (e.g. less than 10° C./min). Alternatively, the soot preform can be sintered at even faster rates in order to create more voids by driving the soot preform through a furnace hot zone where the temperature is greater than 1550° C., more preferably greater than 1700° C., even more preferably greater than 1900° C. Alternatively, the soot preform can be sintered at even faster rates external to the furnace by using an open flame or plasma torch in contact with the soot. If desired, the optical fiber preform can be produced using a series of different consolidation steps, some of which may include conventional consolidation steps to completely sinter a particular preform region into a void-free fully consolidated glass, after which additional soot is deposited and sintered using a void trapping consolidation step. Preferred sintering gases which may be used in the void trapping consolidation step are those which comprise at least one gas selected from the group consisting of nitrogen, argon, $CO_2$, oxygen, Chlorine, $CF_4$, CO, $SO_2$, krypton, neon, and mixtures thereof. Each of these gases exhibits a relatively low permeability in silica glass at or below the consolidation temperature which is suitable for forming voids in accordance with the methods present invention. More preferably, the sintering gas used to form the non-periodically located voids in the annular void-containing region is selected from the group consisting of (1) krypton gas or sulfur dioxide gas or (2) chlorine gas plus at least one of nitrogen, carbon dioxide, or sulphur dioxide, argon or krypton, or (3) mixtures thereof. This chlorine gas can be provided either during the void producing consolidation step, or alternatively the chlorine can be supplied to this glass region prior to the consolidation step, e.g. by using a sufficient amount of chlorine during the drying step that the chlorine is retained within the glass, preferably in an amount greater than 2000 ppm by weight in the glass of this region, more preferably greater than 3000 ppm by weight in the glass of this region.

Preferably these void producing gases are employed either alone or in combination in an amount between 5 and 100 percent by volume, more preferably between about 20-100 percent by volume and most preferably between about 40-100 percent by volume. The remainder of the sintering gas atmosphere is made up of a suitable diluent or carrier gas such as, for example, helium, hydrogen, deuterium, or mixtures thereof. Generally speaking, the greater the percentage by volume of void producing gases (nitrogen, Ar, $CO_2$, $O_2$, $Cl_2$, $CF_4$, CO, $SO_2$, krypton, neon, or mixtures thereof) that is employed in the sintering gas, the larger and more abundant the voids will be in the resultant consolidated glass. More preferably, the sintering gas for use in forming the voids during the consolidation step comprises at least one gas selected from the group consisting of nitrogen, argon, $CO_2$, oxygen, $SO_2$ and krypton, neon, and mixtures thereof. These gases can be utilized entirely alone or in mixtures of such gases along with a carrier gas such as helium. One particularly preferred void producing gas is nitrogen. Applicants have found when employing nitrogen and/or argon either together or individually as a void producing sintering gas it is preferred that the nitrogen and/or argon be employed in the sintering atmosphere in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as helium. These gases have been successfully employed at concentrations greater than 85 percent by volume. In fact, up to 100 percent nitrogen gas, up to 100 percent argon gas, and up to 100 percent oxygen gas have been utilized successfully. Voids can also be created by sintering the soot in a low permeability gas (e.g. nitrogen, argon, $CO_2$, oxygen, Chlorine, $CF_4$, CO, $SO_2$) under a partial vacuum (e.g., wherein the preform is immersed in a sintering atmosphere at a pressure of between about 40 to 750 Torr), and in such cases use of a diluent relatively high permeability gas such as helium is not necessary. Using the void producing consolidation techniques disclosed herein, it is possible to make optical fibers having a cladding comprises a void-containing region having a regional void area percent between about 2 and 6 percent, and in other preferred embodiments, we have found the non-periodically disposed voids in the annular void-containing region preferably comprise a percent regional void area percent in said void-containing region which is between 0.5 and 6 percent, and an average number density of voids greater than 0.2, more preferably greater than 0.5, even more preferably greater than 1.0, and most preferably greater than 2 voids per micron$^2$. Regional void area percent, as used herein, means the total area of the voids in a void-containing annular region divided by the total area of the void-containing annular region (when the optical fiber is viewed in cross-section taken perpendicular to the axis of the optical fiber) times 100, the void-containing region being defined by the inner and outer boundaries of the void-containing region, For example, if the radially innermost edge of the radially innermost void in the fiber has a radial location of 10 microns from the axial centerline of the fiber, and the radially outermost edge of the radially outermost void in the fiber has a radial location of 15 microns from the centerline, then the area of the void-containing region is approximately $(225-100) \cdot pi = 393$ square microns. If the total cross sectional area of voids contained in this void-containing region is 15.7 square microns, then the void area percent of the void-containing region is approximately 4 percent. Regional void area fraction, as used herein, means the total area of the voids in a void-containing annular region divided by the total area of the void-containing annular region (when the optical fiber is viewed in cross-section taken perpendicular to the axis of the optical fiber). Average number density of voids, as used herein, means the total number of voids in the void-containing annular ring region divided by the area of the void-containing annular ring region. We have discovered that by designing the optical fibers so that the cladding comprises a void-containing region spaced from the core region, and wherein the void-containing annular comprises a regional void area percent between about 2 and 10 percent, and an average number density of voids greater than 0.5, more preferably greater than 1.0, even more preferably greater than 2 voids per micron$^2$, and most preferably greater than 5 voids per micron$^2$, much greater uniformity of void distribution can be achieved both across the fiber cross section and along the length of the optical fiber, thereby resulting in more consistent improved bend performance along the length of the optical fiber. For example, by designing the fibers to have average number density of voids and regional void area percent in the ranges describe above, an improved void distribution uniformity can be achieved throughout the circumference and width of the annular void-containing region and along the length of the fiber sufficient to result in a maximum bend loss less than 2 dB per 10 mm diameter turn for an entire fiber length which is greater than 1 m, more preferably greater than 2 m, and even more preferably greater than 100 m, and most preferably greater than 10 Km. More preferably, the void-containing region comprises a void distribution uniformity throughout the circumference and width of the annular void-containing region and along the length of the fiber sufficient to result in a maximum bend loss less than 1 dB per 10 mm diameter turn for an entire fiber length which is greater than 1 m, more preferably greater than 2 m, and even more preferably greater than 100 m, and most preferably greater than 10 km. Even more preferably, the void-containing region comprises a void distribution uniformity throughout the circumference and width of the annular void-containing region and along the length of the fiber sufficient to result in a maximum bend loss less than 0.5 dB per 10 mm diameter turn for an entire fiber length which is greater than 1 m, more preferably greater than 2 m, and even more preferably greater than 100 m, and most preferably greater than 10 km.

In combination with the other sintering gases described above, it is desirable to employ a consolidation process which includes a downfeed of the preform at a rate and temperature which is sufficient to result in at least some of the consolidation gases being intentionally trapped. This can occur, for example, by heating of at least a portion of the soot preform greater than about 10° C./min, more preferably greater than about 12° C./min, even more preferably greater than about 14° C./min. The sintering temperatures employed in the present invention preferably can range from 1100° C. to 1600° C., more preferably between about 1400 and 1550° C., and most preferably between about 1480 and 1550° C. One particularly preferred sintering temperature is approximately 1490° C. Additional information related to manufacturing such void-containing regions within the cladding of the optical fiber can be found, for example, in U.S. patent application Ser. No. 11/583,098, the specification of which is hereby incorporated by reference in its entirety.

FIG. 3 illustrates a process which may be used to draw a core cane for use in the present invention. For example in one such embodiment, a soot preform is formed as described above with respect to FIG. 1, after which the soot preform is consolidated using conventional consolidation techniques (e.g., using consolidation temperatures of higher than 1300° C. in an atmosphere of 100 percent helium) to form a void free core preform. For example, in the case of a fiber preform which is to be used to make a pure silica core fiber, the core preform would consist of relatively pure silica with no significant index of refraction adjusting dopants. Alternatively, in the case of an optical fiber preform which is to be used to make a pure germania doped core fiber, the core preform could consist of a germania doped core region and optionally a portion of the cladding (e.g. undoped silica cladding). The resultant consolidated core preform 31 is placed in a core cane draw furnace 37 and at least one rod-shaped core cane segment 33 having a reduced outer diameter is drawn therefrom. The preform 31 is heated to a temperature of, for example, between about 1700° C. and 2000° C., and the cane is drawn in direction B until it reaches diameter $d_o$. The diameter is measured via diameter measurement devices 39 and 42. The controls 38 control the tension applied to the cane by suitable control signals to a tension mechanism 40, shown here as two tractor wheels, to draw down the cane 33 at the proper speed. In this way, it is possible to derive a length of core cane 33 having an outer diameter dimension of for example between about 1 mm and 16 mm This core cane can then be used as the target or mandrel 24 for additional soot deposition or as the rod in a rod in tube process, as will be described further below.

Figure 5:
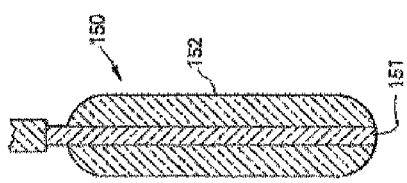
FIG. 5 illustrates the fully consolidated preform which results from the consolidation step illustrated in FIG. 4.

In one preferred embodiment, the process described above with respect to FIG. 3 can be used to form a core cane preform which can then be used as the target or mandrel for additional soot deposition which will be consolidated using the void forming techniques disclosed herein and thus eventually become the cladding of the optical fiber. In one such embodiment, for example, a fully consolidated, void free glass core cane can be used as the bait rod 24 in the soot deposition step illustrated in FIG. 1. The glass core cane may be undoped silica so the resultant optical fiber will be silica core fiber whose core consists essentially of pure silica. Alternatively, the core cane may consist of one or more doped regions which together form the light transmitting core region of the optical fiber. After the soot is deposited onto the glass core cane, the outer soot region 120 can be fully consolidated in consolidation furnace 129 as illustrated in FIG. 4. Preferably, during this consolidation step, the void forming consolidation process described above is carried out to form a consolidated optical fiber preform 150, as illustrated in FIG. 5.

As described above, preferred gases for use in the void forming consolidation step include at least one gas selected from the group consisting of nitrogen, argon, $CO_2$, oxygen, Chlorine, CF4, CO, $SO_2$, krypton, neon, and mixtures thereof. Preferably these void producing gases are employed either alone or in combination in an amount between 5 and 100 percent by volume, more preferably between about 20-100 percent by volume and most preferably between about 40 and 100 percent by volume. The remainder of the sintering gas atmosphere is made up of a suitable diluent or carrier gas such as, for example, helium, hydrogen, deuterium, or mixtures thereof. Generally speaking, the greater the percentage of void producing gases (nitrogen, Ar, $CO_2$, Kr, $O_2$, $Cl_2$, $CF_4$, CO, $SO_2$, Ne) employed in the sintering gas, the larger and more abundant the voids will be in the resultant consolidated glass. One particularly preferred void producing gas is nitrogen, which is preferably employed in an amount greater than 10 percent by volume, more preferably greater than 30 percent by volume, even more preferably greater than about 50 percent by volume, and most preferably greater than about 65 percent by volume, with the remainder of the sintering atmosphere being a carrier gas such as, for example, helium. Voids can also be created by sintering the soot in a low permeability diluent gas (e.g. nitrogen, argon, $CO_2$, oxygen, Chlorine, $CF_4$, CO, $SO_2$) under a partial vacuum (e.g., wherein the sintering atmosphere is at a pressure of between about 40 to 750 Torr), and in such cases use of a diluent relatively high permeability gas such as helium is not necessary. Chlorine can be incorporated into the glass by using $Cl_2$, $SiCl_4$ or other chlorine containing dopants. Using the void producing consolidation techniques disclosed herein, it is possible to make optical fibers whose cladding comprises a void-containing region having a regional void area percent greater than 0.5 percent, more preferably greater than about 1, even more preferably greater than about 5 and most preferably greater than about 10 percent. Most preferably, the region having voids does not extend to the outer edge of the cladding such that there are open voids or voids on the outside of the fiber.

The sintering temperatures employed in the present invention preferably range from 1100° C. to 1550° C., more preferably between 1300° C. and 1500° C., and most preferably between 1350° C. and 1500° C. One preferred sintering temperature is approximately 1490° C. The gaseous atmosphere employed during the consolidation process, the temperature inside the consolidation furnace, and preform consolidation rate are selected so that, during the soot consolidation process, gases are intentionally trapped within the preform, forming voids in the consolidated glass. These gas containing voids are preferably not entirely outgassed prior to and/or during the fiber draw process, so that the voids remain in the fiber after the fiber has been drawn. A variety of process parameters can be controlled to vary and control the size of the voids. For example, increasing the consolidation time or temperature can increase the void size, as the increased temperature causes the gases trapped within the voids to expand. Similarly, the size and area percent of the voids can be impacted by the draw conditions. For example, a longer hot zone in a draw furnace and/or faster draw speeds tend to increase the size as well as the area percent of the voids. Selection of a gas that is more permeable in glass at the consolidation temperature will result in smaller voids. Sintering rate can also have a significant effect on void size and void quantity. A faster sintering rate will result in the formation of more and larger voids. However, use of sintering rates that are too slow will result in no voids being formed, as the gas will have time to escape through the glass. Consequently, the downfeed rate of the preform and/or the consolidation temperature employed are preferably high enough to result in the heating of at least a portion of the preform at a rate greater than about 10° C./min, more preferably greater than about 12° C./min, even more preferably greater than about 14° C./min. Generally speaking, an optical fiber preform having a lower soot density will result in formation of more voids. However, the density of the deposited soot in a particular optical fiber preform can be varied to position more voids (higher regional void area percent) where desired. For example, a first high density soot region can be deposited directly onto a consolidated glass (e.g. pure silica) core cane, followed by a second region of soot having a lower density than that of the first. We have found that this causes a higher void area percent to form near the core (i.e. in the high density soot region). The silica containing soot preferably has a bulk density of between about 0.10 g/cc and 1.7 g/cc, more preferably between about 0.30 g/cc and 1.0 g/cc. This effect can also be used to form consolidated void-containing preforms which alternate between low or no void-containing regions and higher void-containing regions; wherein the initial soot density radial variation is greater than 3 percent over a distance of at least 100 microns. Such preforms can be used, for example, to make optical fibers having cladding regions which alternate between regions of void free glass and void-containing glass. Fibers having such alternating void-containing and void-free regions would exhibit properties useful as Bragg gratings. Optical preforms produced by the method described herein are preferably comprised of a void-free germania doped core, a void-free silica inner cladding, a void-containing silica ring and a void-free silica overclad. The void-containing ring region can contain over approximately 1,000,000 voids in the cross-sectional slice of the preform wherein the voids can be approximately 1 to 10 microns in average diameter and comprised approximately 1-20 area percent voids. These voids are typically discrete and isolated spheroid shape surrounded by silica, therefore each void is non-continuous in the axial or radial position along the length of the optical preform. Upon drawing the optical preform into an optical fiber the voids become elongated in the direction of draw.

We discovered that during the drawing of the optical fiber preform to an optical fiber that the number of voids in any given cross-section decreases from the original number in the preform to that of the drawn fiber. For example, a 60 mm diameter preform having 100,000 voids in a cross-sectional ring in the preform can yield 200 voids in the cross-sectional ring for the 125 micron diameter drawn fiber. We believe this mechanism for reduction in number is due to what we term as "diffusional coalescence", i.e., the voids are coalescing together to form fewer numbers of voids. We believe that the degree of diffusional coalescence which occurs during any step of reducing the diameter of a void-containing preform (e.g. drawing the preform into fiber, redrawing the preform into a smaller preform, etc.) can be influenced by the time-temperature history of the preform during the diameter reduction step, choice of gas in the voids and, composition of the glass surrounding the voids. Therefore, the same preform that results in 200 cross-sectional voids in the optical fiber can also yield, e.g., from 500 or 1,000 to even 10,000 voids in cross-section and can be controlled by the above preform processing parameters and glass compositions.

In contrast, optical fiber preforms made by a series of continuous tubes in stack-and-draw process or by drilling voids along the axial length of a preform, do not undergo this phenomenon, i.e., the number of voids in the preform is substantially similar to the number of voids in the drawn optical fiber. Thus unlike these methods, our non-continuous void-containing preforms can have tailored microstructure in the fiber in order to obtain optical fiber attributes. One should also note that using the conventional stack-and-draw process or by drilling voids along the axial length of a preform it can rapidly become difficult and cumbersome to produce greater than, for example, 50 voids. In contrast, fiber produced from our preforms can yield hundreds, even thousands of voids in the cross-section.

Voids formed in the optical fiber preform get stretched into elongated voids as the preform is drawn into optical fiber. In the neck-down or "root" region of the optical fiber preform, the glass temperature increases from above its softening point (approximately 1630° C. for silica) to approximately 1900 to 2100° C. (depending on the fiber draw conditions). The fiber then cools back to the softening point, at or after which point the final fiber diameter is reached. The reduction in the number of voids due to diffusional coalescence was found to depend on several parameters including: 1) the diffusivity of the gas (or gases) in the voids which migrates through the glass and, 2) the temperature-time history the glass experiences in the draw neck-down region. We have established that the ratio of ln[voids in preform/voids in fiber] is proportional to the parameter $\Sigma$, defined as:

$$\Sigma = \int_0^{z_{max}} \frac{D_{gas}\phi_f}{V_f R_f^2} dz \quad [1]$$

In Eq. [1], z is the axial location along the preform with the integral lower limit '0' corresponding to the axial location where the preform starts to neck down and upper limit '$z_{max}$' corresponding to the axial location where the preform goes to final fiber diameter (typically 125 microns). We have also found that the parameter $\Sigma$ can more easily be approximated with a simplified process parameter $\Omega$ as shown in Eq. [2] and is defined as:

$$\Omega = \frac{D_{gas(T_{avg})}\phi_f L_{root}}{V_f R_f^2}, \text{ where} \quad [2]$$

$D_{gas}$ (expressed as cm²/sec) is the gas (which is in the void) diffusivity in glass and varies from axial location to axial location due to the non-isothermal glass temperature in the neck down region, $\phi_f$ is the regional void area fraction, $V_f$ is the fiber draw speed in cm/second and $R_f$ is the fiber radius in cm. In estimating process parameter $\Omega$ (a dimensionless number), we have used the following relations for $N_2$ and Kr gas diffusivities $D_{gas}$ as shown in Eq. [3] and Eq. [4], respectively, for silica glass wherein e is the mathematical constant 2.71828 (shown truncated to 5 decimal places and also sometimes expressed as "Exp"):

Nitrogen:

$$D_{N_2} = 1.2 \times 10^{-4} \text{Exp}\left[-\frac{20000}{T_{avg} + 273}\right] \quad [3]$$

And for Krypton:

$$D_{Kr} = 2.4 \times 10^{-5} \text{Exp}\left[-\frac{20000}{T_{avg} + 273}\right] \quad [4]$$

Average temperature $T_{avg}$ is the arithmetic mean of the softening point temperature in ° C. of the optical fiber preform and the peak draw furnace temperature (peak draw furnace temperature is the peak furnace temperature and is typically located in the region corresponding to the necked down root region of the optical fiber preform), $\phi_f$ is the regional void area fraction in the fiber and $L_{root}$ is the draw root length in cm as measured from the beginning of the neck down region and ending when the preform has reached the final fiber diameter (typically 125 microns).

For example, Ω in Example 1 from Table 1 having a preform diameter of 5.8 cm and drawn to a 125 micron diameter fiber is obtained as follows:

Furnace set point temperature $(T_\epsilon)$=1985° C.; Glass softening point $(T_o)$=1630° C.; Gas diffusivity at $(T_\epsilon + T_o)/2$=1.60×10$^{-9}$ cm$^2$/second; Regional void area fraction in fiber, $\phi_f$=0.042; Preform root length $(L_{root})$=30.9 cm; Fiber draw speed $(V_f)$=1000 cm/second; Fiber radius $(R_f)$=0.00625 cm $$\Omega = [1.60 \times 10^{-9} \text{ cm}^2/\text{second} \times 0.042 \times 30.9 \text{ cm}]/$$
$$[1000 \text{ cm/second} \times (0.00625 \text{ cm})^2]$$
$$= 5.28 \times 10^{-8}$$

We have found that in the preferred embodiments:

$$\Omega < 5 \times 10^{-7}$$
$$\Omega = \frac{D_{gas(T_{avg})} \phi_f L_{root}}{V_f R_f^2}$$

Low Ω equates to a lower diffusional coalescence, and thus results in a greater number of smaller diameter voids (as opposed to fewer and larger voids) being retained from the optical fiber preforms and in the resultant optical fiber. More preferably, Ω is less than 4×10$^{-7}$, even more preferably less than 3×10$^{-7}$, even more preferably less than 2.5×10$^{-7}$, and most preferably less than 2×10$^{-7}$. A number of process parameters can be utilized to help reduce the magnitude of the process parameter Ω to below 5×10$^7$. For example, utilizing a lower draw furnace temperature, which in turn enables a higher draw tension (e.g. greater than 200 g., more preferably between 250 and 300 grams). Additionally, using a smaller or narrower hot zone in the draw furnace, which will result in a shorter $L_{root}$ (and a more blunt root region of the optical fiber preform). Likewise using a faster draw speed, such as greater than 20 m/s, more preferably greater than 25 m/s, most preferably greater than 30 m/s, will help to reduce process parameter Ω, as will utilizing a lower permeability glass, which may be achieved, for example by utilizing higher amounts of chlorine (e.g. greater than 2000 ppm by weight, more preferably greater than 3000 ppm by weight, and in some embodiments the Cl can be greater than 10,000 ppm by weight, being retained within the glass region of the annular void-containing ring region of the optical fiber).

Referring to FIG. 5, using the techniques described above, an optical fiber preform 150 can be formed which comprises a void-free core region 151 which is surrounded by a cladding 152 which is comprised of a plurality of voids. By forming the void-containing region in cladding 152 with a sufficient number of voids of an appropriate size, cladding 152 will serve as an optical cladding which guides light along core region 151 after the optical fiber preform is drawn into an optical fiber. Alternatively, the void-containing region can be employed to improve the bend performance of the optical fiber. If desired, prior to drawing the preform 150 into an optical fiber, additional soot can be deposited over cladding region 152 and consolidated. The additional deposited cladding material may or may not be consolidated to contain voids, as desired.

Figure 6A:
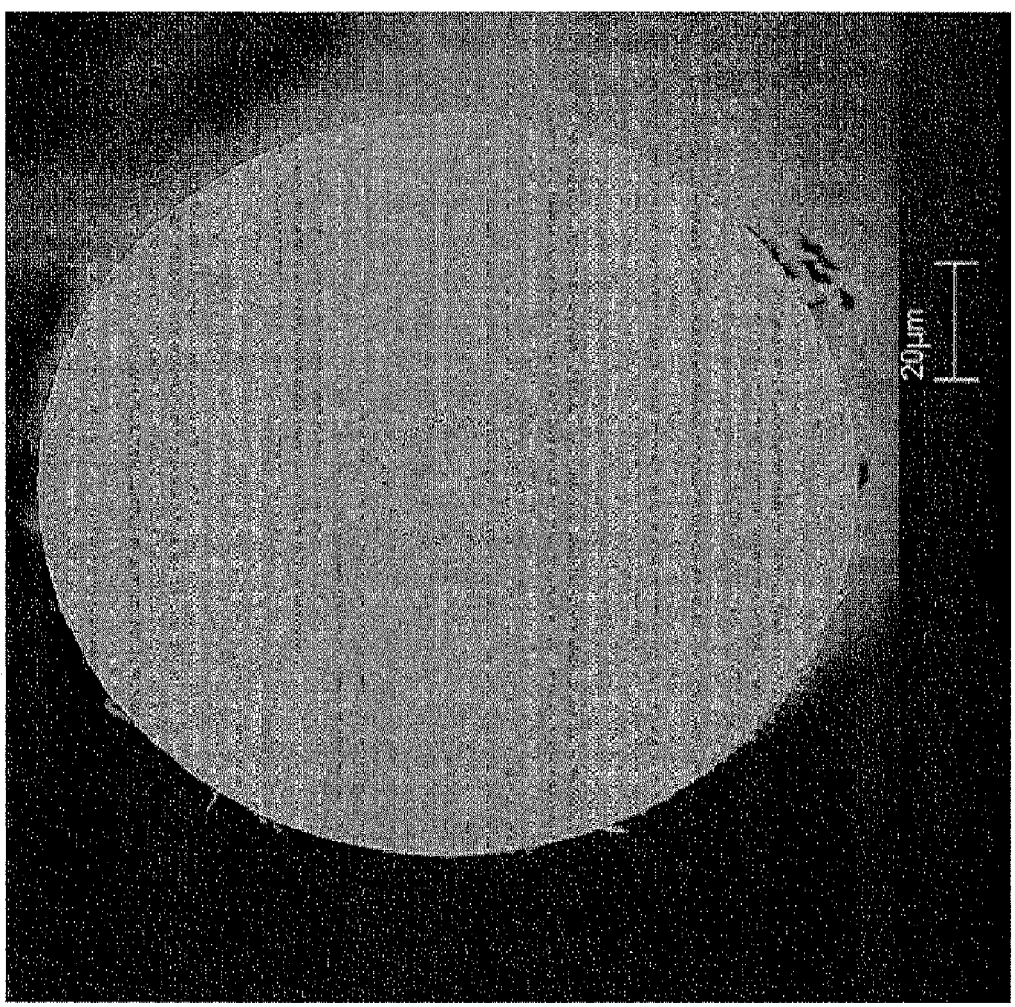
FIGS. 6a and 6b illustrate photographs of a cross-section of a fiber made in accordance with one embodiment of the invention.
Figure 6B:
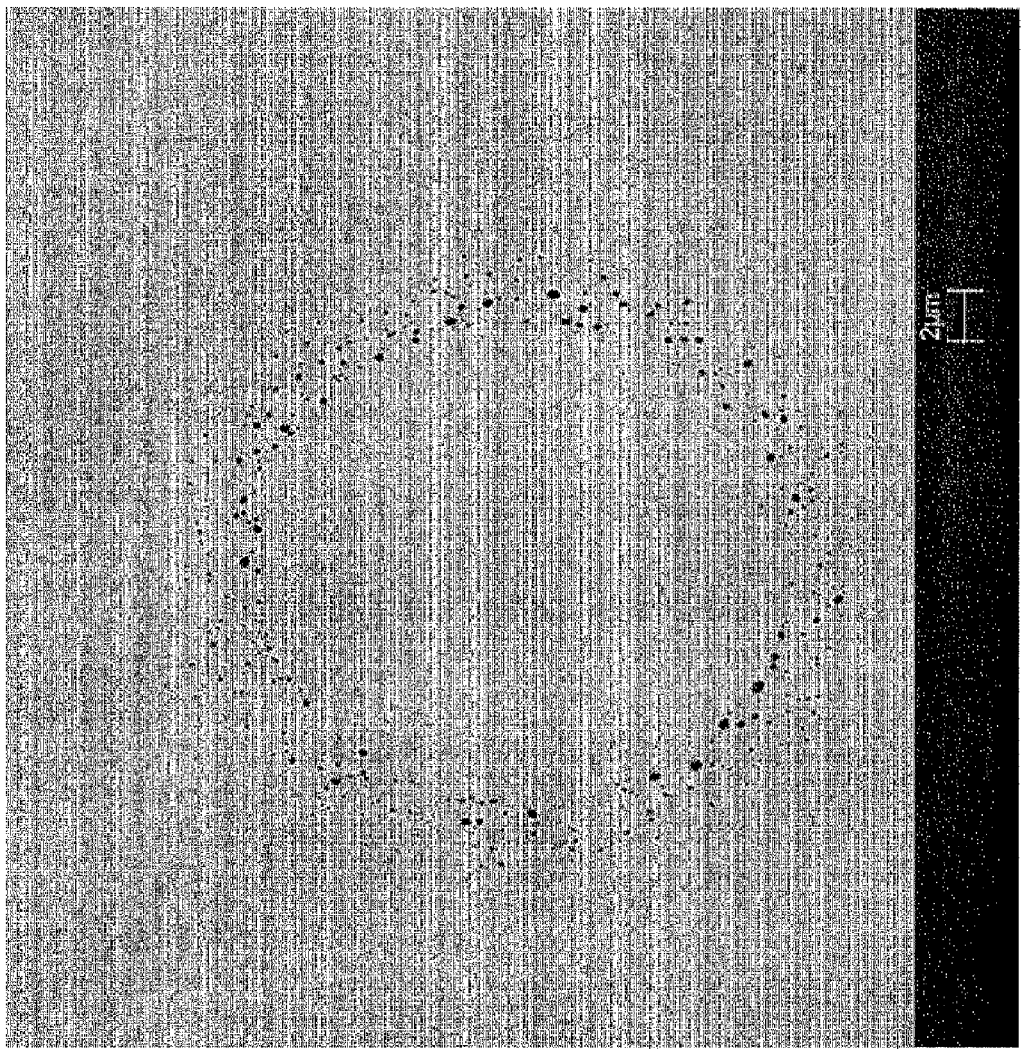

An example of a fiber which is drawn from such a preform is illustrated in FIGS. 6a and 6b. FIG. 6a is an SEM photomicrograph of a 125 micron diameter fiber taken at 1500× magnification, and FIG. 6b is an SEM photomicrograph of the central region of the fiber illustrated in FIG. 6a, taken at 7500× magnification. The fiber in FIGS. 6a and 6b comprises a core region which is surrounded by a cladding region which comprises voids which are positioned to be effective to guide light along the germania-doped silica core.

Alternatively, instead of depositing soot onto an already formed core cane, the void forming process described above can be used to form a tube of consolidated glass having a void-containing region therein as described above with respect to FIG. 2, and that tube can be used to sleeve a core cane.

Figure 7:
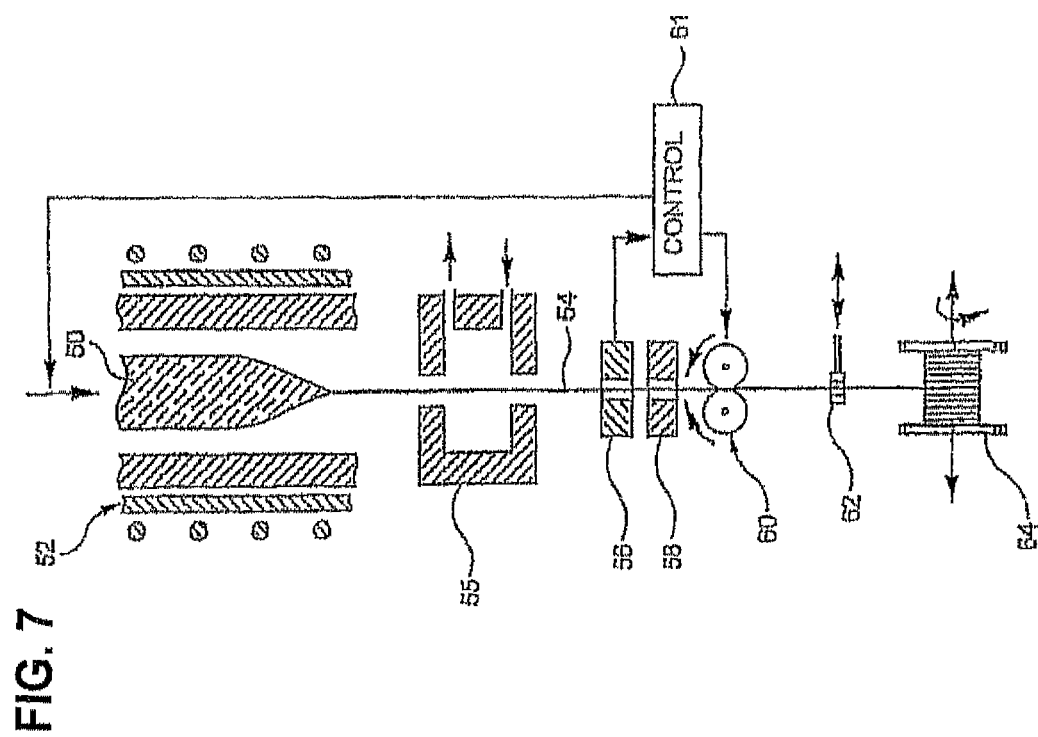
FIG. 7 illustrates a draw process and apparatus that may be employed in the method of the present invention.

In any of the embodiments disclosed herein, the resulting final consolidated optical fiber preform 50 may be drawn into an optical fiber by positioning the preform within a draw furnace 52 as shown in FIG. 7, and then heating and drawing the optical fiber 54 using conventional methods and apparatus. The fiber 54 is then cooled in cooling chamber 55 and measured for final diameter by non-contact sensor 56. One or more coatings may be applied and cured by coating apparatus 58. During draw, the fiber 54 passes through a tension assembly 60 whereby tension is applied to draw the fiber 54 from the preform 50. The tension is controlled via control apparatus 61 to maintain the fiber diameter at a predetermined set point. Finally, the coated fiber 54 is wound by feedhead 62 onto a fiber storage spool 64.

The same process described above with respect to FIG. 3 for forming core canes can alternatively be used to redraw void-containing consolidated tubes. Such a redraw process can be used to modify the size of the voids contained in the tube. For example, the greater the diameter reduction that occurs when the void-containing preform is redrawn, the smaller the void size will be in that preform.

Using the void producing consolidation techniques disclosed herein, optical fibers have been achieved which are comprised of a core region having a first refractive index and a cladding region having a second refractive index lower than that of the core such that light which is transmitted through the fiber is retained generally within the core, whereby said voids are located in and thereby form the cladding of said optical fiber and the void area percent of the voids is substantially non-zero.

Using the techniques described herein, fibers can be made wherein the maximum size of any of the voids, in the region where the fraction of power of light is greater than 80 percent, is less than the wavelength of light being transmitted. By maximum size, we mean the maximum diameter of any particular void when the optical fiber is viewed in perpendicular cross-section transverse to the longitudinal axis of the fiber. For example, fibers have been made wherein the mean void diameter in the void-containing region is between 5 and 500 nm, more preferably between 30 and 300 nm, even more preferably between 30 and 200 nm, and most preferably between 30 and 150 nm. In other preferred embodiments the non-periodically disposed voids have a mean diameter of less than 100 nm and greater than 2 nm. In other preferred embodiments the non-periodically disposed voids have a mean diameter of less than 50 nm and greater than 2 μm.

Index adjusting dopants such as germanium and fluorine can be used, if desired, either individually or together, to further adjust the refractive index of the core with respect to the index of refraction of the cladding or with respect to the index of refraction of pure silica. For example, in one such preferred embodiment, a germanium core cane is used as a starter rod, upon which additional soot cladding material is deposited, preferably using OVD deposition techniques as described above. The soot cladding region is then consolidated as described above to form a void-containing cladding region around the germania doped silica core region.

Such a fiber can be used in telecommunication networks (typically operating in 850, 1310 and/or 1550 nm windows) including long-haul, metro, access, premise and data centers as well as data communication applications and control area networks within buildings and mobile (auto, bus, train, plane) applications. Such telecommunications networks typically include a transmitter and receiver which is optically connected to the optical fiber.

In some embodiments, the fibers disclosed herein exhibit non-periodic void-containing region which when viewed in cross-section exhibit greater than 100 voids, more preferably greater than 200 voids, even more preferably greater than 400 voids, and in some embodiments greater than 600 voids in the annular void-containing region of a given optical fiber perpendicular cross-section. In fact, the techniques disclosed herein are sufficient to result in greater than 1000, and even greater than 2000 voids in the annular ring of the fiber, even for annular rings which have a width of less than 10, and more preferably less than 7 microns (e.g., radial width of between 1 to 7 microns).

For example, the fibers disclosed herein are capable of superior bend resistance compared to fibers of the prior art while simultaneously exhibiting excellent mode field diameters. By superior, we mean that using the methods disclosed herein, it is possible to make fibers which are single moded at 1550 nm in some embodiments, also at 1400 nm in other embodiments, and also at 1260 nm in still other embodiments, and which are capable of less than 0.5 dB attenuation increase at 1550 nm per turn for a 20 mm diameter bend while simultaneously exhibiting mode field diameters greater than 9 microns, and more preferably greater than 10 microns, at 1550 nm. Such excellent bend performance makes these fibers attractive candidates for fiber-to-the-home, access fiber, fiber-in-the-home applications, and fiber jumpers (these are typically short sections of fiber (1-20 meters) with connectors on each end to connect to an optical system or device). For example, the fibers disclosed herein may be employed in an optical fiber telecommunications system comprising a transmitter, a receiver, the fiber(s) being optically connected to said transmitter and receiver. Preferably in such applications (i.e. when the fiber is acting as a transmission fiber in a telecommunications system) the fiber is devoid of any active elements such as erbium, etc.

Using the void producing consolidation techniques disclosed herein, it is possible to make optical fibers having cladding regions which exhibit a total void area percent (i.e., total cross-sectional area of the voids divided by total cross-sectional area of the optical fiber×100). Fibers have been made having total void area percents greater than about 0.01, greater than 0.1, greater than about 1, greater than about 5, and greater than 10 percent. However, in some embodiments, total void area percent of less than 1, and even less than 0.7, and in some embodiments less than about 0.2 percent, can result in greatly improved bend performance. In some preferred embodiments, the total void area percent is between 0.01 and 0.4 percent, more preferably between 0.02 and 0.2 percent. Such void-containing cladding regions call be used to lower the refractive index relative to the core and thus form the cladding region which guides light along the core of the optical fiber. By selecting the appropriate soot consolidation conditions, as will be described below, a variety of useful optical fiber designs can be achieved. For example, by selecting the maximum void size in the cladding to be less than that of the wavelength of light which is to be transmitted (for example, less than 1550 nm for some telecommunications systems), and preferably less than one half of the wavelength of light which is to be transmitted along the fiber, low attenuation fibers can be achieved without having to use expensive dopants. Consequently, for a variety of applications, it is desirable that the voids in the annular void-containing region exhibit a mean void size which is between about 5 and 500 nm, more preferably between about 30 and 300 nm, even more preferably between about 30 and 200 nm, and most preferably between about 30 and 150 nm. In other preferred embodiments the non-periodically disposed voids have a mean diameter of less than 100 nm and greater than 2 nm. In other preferred embodiments the non-periodically disposed voids have a mean diameter of less than 50 nm and greater than 2 nm. In some embodiments, the fibers disclosed herein have greater than 100, more preferably greater than 200, even more preferably greater than 400, and in some embodiments greater than 600 voids when viewed in cross-section. In fact, the techniques disclosed herein are sufficient to result in greater than 1000, and even greater than 2000 voids in the annular ring of the fiber, even for annular rings which have a width of less than 10, and more preferably less than 7 microns (e.g., radial width of between 1 to 7 microns). Of course, the most preferred fibers will exhibit combinations of these characteristics. Thus, for example, one particularly preferred embodiment of optical fiber would exhibit greater than 500, the voids having a mean diameter between 30 and 200 nm, although useful and bend resistant optical fibers can be achieved using larger and greater numbers of voids. The void number, mean diameter, max diameter, and total void area percent of voids can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber, but these dopants can also be avoided in the intermediate annular region and instead, the voids (in combination with any gas or gases that may be disposed within the voids) can be used to adjust the manner in which light is guided down the core of the fiber. The void-containing region may consist of undoped (pure) silica, thereby completely avoiding the use of any dopants in the void-containing region, to achieve a decreased refractive index, or the void-containing region may comprise doped silica, e.g. fluorine-doped silica having a plurality of voids.

In one set of embodiments, the core region includes doped silica to provide a positive refractive index relative to pure silica, e.g. germania doped silica. The core region is preferably void-free. FIG. 8a schematically illustrates a cross-section of an optical fiber made in accordance with the invention, shown with a coating. FIG. 8b corresponds to the fiber of FIG. 5a and illustrates schematically its refractive index profile in region 180. The refractive index profile corresponding to the fiber in FIG. 8a in one cross section can be interpreted schematically to be a combination of individual index components of silica and voids, as shown in FIG. 8b. The exact void distribution profile can be determined by the Scanning Electron Microscopy (SEM) technique described herein. This figure illustrates that the relative percent index of refraction in region 180 fluctuates between $\Delta_3=-28\%$ (index of void filled gas relative to that of silica) and that of the glass surrounding the voids (in this example it is silica, with the relative % index of refraction $\Delta_5$ of about 0%). A typical relative refractive index percent $\Delta_5$ will be between −1% and +3%, more preferably between −1% and 1%, relative to pure silica glass, depending on the traditional dopants, e.g., fluorine and $GeO_2$, present in the glass surrounding the voids. That is, the index of region 180 fluctuates, and in the example of FIG. 5b, the width of the gas filled voids, and/or the glass filled spacing Sv between the gas filled voids is randomly distributed and/or are not equal to one another. That is, the voids are non-periodic. The refractive index of the void filled region is significantly different from that of conventionally doped silica. It is preferable that the mean distance between the voids, Di, is less than 5000 nm, more preferably less than 2000 nm, even more preferably less than 1000 nm, for example less than 750 nm, 500 nm, 400 nm, 300 nm, 200 nm or even less than 100 nm. As illustrated in FIGS. 8a and 8b, in some embodiments, the core region 170 comprises a single core segment having a positive maximum refractive index relative to pure silica $\Delta_1$ in %, and the single core segment extends from the centerline to a radius $R_1$. In one set of embodiments, $0.30\% < \Delta_1 < 0.40\%$, and $3.0 \, \mu m < R_1 < 5.0 \, \mu m$. In some embodiments, the single core segment has a refractive index profile with an alpha shape, where alpha is 6 or more, and in some embodiments alpha is 8 or more. In some embodiments, the inner annular void-free region 182 extends from the core region to a radius $R_2$, wherein the inner annular void-free region has a radial width $W_{12}$, equal to $R_2 - R_1$, and $W_{12}$ is greater than 1 $\mu m$. Radius $R_2$ is preferably greater than 8 $\mu m$, more preferably greater than 10 $\mu m$. The ratio of the core radius $R_1$ to $R_2$, $R_1/R_2$, is preferably between 0.2 and 0.6, more preferably between 0.3 and 0.5 and even more preferably between 0.33 and 0.45. The intermediate annular void-containing region 184 extends radially outward from $R_2$ to radius $R_3$ and has a radial width $W_{23}$, equal to $R_3 - R_2$. The outer annular region 186 extends radially outward from $R_3$ to radius $R_4$. Radius $R_4$ is the outermost radius of the silica portion of the optical fiber. One or more coatings may be applied to the external surface of the silica portion of the optical fiber, starting at $R_4$, the outermost diameter or outermost periphery of the glass part of the fiber. The core region 170 and the cladding region 180 are preferably comprised of silica. The core region 170 is preferably silica doped with one or more dopants. Preferably, the core region 170 is void-free. The void-containing region 184 has an inner radius $R_2$ which is not more than 20 $\mu m$. In some embodiments, $R_2$ is not less than 10 $\mu m$ and not greater than 20 $\mu m$. In other embodiments, $R_2$ is not less than 10 $\mu m$ and not greater than 18 $\mu m$. In other embodiments, $R_2$ is not less than 10 $\mu m$ and not greater than 14 $\mu m$. The void-containing region 184 has a radial width $W_{23}$ which is not less than 0.5 $\mu m$. In some embodiments, $W_{23}$ is not less than 0.5 $\mu m$ and not greater than 20 $\mu m$. In other embodiments, $W_{23}$ is not less than 2 $\mu m$ and not greater than 12 $\mu m$. In other embodiments, $W_{23}$ is not less than 2 $\mu m$ and not greater than 8 $\mu m$.

The cladding region 180 extends to a radius $R_4$ which is preferably not less than 40 $\mu m$; in some embodiments, $R_4$ is about 40 $\mu m$; in other embodiments, $R_4$ is not less than 60 $\mu m$; in other embodiments, $R_4$ is about 62.5 $\mu m$. In some embodiments, the outer annular region 180 has a radial width not less than 20 $\mu m$. In other embodiments, the outer void-free region 186 has a radial width not less than 30 $\mu m$. In still other embodiments, the outer void-free region 186 has a radial width not less than 40 $\mu m$. In some embodiments, the core region 170 comprises germania doped silica. In other embodiments, the core region 170 comprises fluorine doped silica.

The core region preferably comprises a central core segment extending radially outwardly from the centerline.

In one set of embodiments, the core region 170 comprises a single core segment having a relative refractive index $\Delta 1$ which is positive relative to pure silica. The single core segment can have a refractive index profile with a step shape or a rounded step shape or other shape. In some of these embodiments, the single core segment has a refractive index profile with an alpha shape, and preferably alpha is not less than 8. Preferably, the single core segment extends to a radius $R_1$ which is not less than 3.8 $\mu m$, and in some embodiments, $R_1$ is not less than 4.0 $\mu m$ and not more than 4.5 $\mu m$. In some embodiments, the core region extends to a radius $R_1$, wherein the void-containing region has an inner radius $R_2$, and wherein the ratio $R_1/R_2$ is between 0.3 and 0.5.

The core region 170 can comprise a plurality of core segments, thus the core region comprises at least one core segment in any of the embodiments disclosed herein.

In some embodiments, the refractive index profile of the core region 170 provides single-moded transmission of the optical signals at 1550 nm n, and further preferably provides a zero dispersion wavelength between 1300 and 1324 nm, and further preferably provides a mode field diameter at 1310 nm greater than 8.6 $\mu m$.

In some embodiments, $\Delta_1$ is not more than 0.40%. In other embodiments, $\Delta_1$ is not more than 0.38%.

Preferably, the optical fiber disclosed herein further comprises a coating surrounding and directly adjacent the cladding region. In some embodiments, the optical fiber comprises a single coating layer surrounding and directly adjacent the cladding region. In some embodiments, at least some of the voids contain at least one gas selected from the group consisting of argon, nitrogen, carbon monoxide, carbon dioxide, chlorine, oxygen, $CF_4$, $C_2F_6$, $SO_2$, Kr, Ne, and mixtures thereof. More preferably, the voids in the void-containing region comprise krypton gas or sulphur dioxide gas or chlorine gas plus at least one of nitrogen, carbon dioxide, argon, krypton or sulphur dioxide, or mixtures thereof.

EXAMPLES

The invention will be further illustrated by the following examples. Unless otherwise noted, in each of the examples below, when the fiber was drawn the fiber was coated using conventional coatings (i.e. conventional acrylate based primary and secondary coatings).

Unless otherwise noted, in each of the examples below, when the fiber was drawn the fiber was coated using conventional coatings (i.e. conventional acrylate based primary and secondary coatings).

Examples 1-4

490 grams of SiO2 (0.39 g/cc density) soot were deposited via outside vapor deposition (OVD) onto a fully consolidated 1 meter long×20 mm diameter step index (having an approximate 0.34 percent delta, 0.43 core/clad diameter ratio) solid GeO2-SiO2 core-SiO2 clad void-free core cane, thereby resulting in a preform (sometimes referred to as a blank, optical blank or optical preform) comprising a consolidated void-free core region which was surrounded by a consolidated void-free silica cladding region which in turn was surrounded by a soot silica region. The soot cladding of this assembly was then sintered as follows. The assembly was first dried for 2 hours in an atmosphere consisting of helium and 10 percent chlorine and 1 percent CO (all percent gases by volume) at 1100° C. in the upper-zone part of the furnace, followed by down driving at 200 mm/min (corresponding to approximately a 100° C./min temperature increase for the outside of the soot preform during the downdrive process) through a hot zone set at approximately 1500° C. in a 100 percent krypton (by volume) sintering atmosphere. The preform assembly was then re-down driven (i.e., a second time)

through the hot zone at 100 mm/m in (corresponding to approximately a 50° C./min temperature increase for the outside of the soot preform during the downdrive process). The preform assembly was then re-down driven (i.e., a third time) through the hot zone at 50 mm/min (corresponding to approximately a 25° C./min temperature increase for the outside of the soot preform during the downdrive process). The preform assembly was then re-down driven (i.e., a fourth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a krypton-seeded silica overclad preform. Following each downdrive step, the preform assembly was updriven at 200 nm/min into the upper-zone part of the furnace (which remained set at 1100° C.). The first series of higher downfeed rate were employed to glaze the outside of the optical fiber preform, which facilitates trapping of the gases in the preform. The preform was then placed for 24 hours in an argon purged holding oven set at 1000° C. to outgas any remaining helium in the preform. This preform was then redrawn in an argon atmosphere on a conventional graphite redraw furnace set at approximately 1780° C. into void-free GeO2-SiO2 core, void-free SiO2 clad, krypton-seeded (i.e., the non-periodically located voids contained krypton gas) silica overclad canes which were 11 mm in diameter and 1 meter long. One of 11 mm canes was placed back in a lathe where 4000 grams of additional SiO2 (0.42 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1100° C. followed by down driving at 6 mm/min through a hot zone set at 1500° C. in a 100% helium (by volume) atmosphere in order to sinter the soot to a germania containing void-free core, silica void-free inner cladding, silica krypton-seeded ring (i.e. silica with voids containing krypton), and void-free overclad preform. The preform was placed for 24 hours in an argon purged holding oven set at 1000° C. to outgas the helium from the preform. The optical fiber preform was drawn to 10 km lengths of 125 micron diameter optical fiber having a core radius of about 4.5 microns at 101 ms at approximately 1900 to 2000° C. in a helium atmosphere on a graphite resistance furnace having an element length of 4 inches or 8 inches by 3.5 inch inside diameter as described in Table 1 below. The temperature of the optical preform was controlled by monitoring and controlling the optical fiber tension; the fiber tension was held at one value between 50 to 600 grams during each portion (e.g., 10 Km lengths) of a fiber draw run and is listed in the Table 1. Optical and physical characteristics (including SEM analysis) for these fibers which are shown as Examples 1-4 are also listed in the Table 1.

Also set forth for each example in Table 1 is the void gas, meaning the gas that is contained within the voids of the annular ring of the fiber, the core/clad ratio, which is the ratio of outer radius of the germania doped core to the outer radius of the inner cladding region (also the inner radius of the void-containing region). Also set forth are the core delta percent, the percent void gas used during the void producing consolidation step (the remainder of the gas during this consolidation step was helium, which was then outgassed from the preform prior to or during the fiber drawing step). The length of the draw furnace heating elements (i.e. the furnace hot zone) used to draw the preform is given in inches. The preform diameter is provided in cm, and the number of voids in the preform after consolidation is given. Also provided are the glass softening point and the gas diffusivity for the gas contained in the voids. Fiber draw speed is given in cm/s, and final fiber diameter is given in microns. Fiber radius in cm is also provided. Fiber draw tension is provided in grains, and preform root length is given in cm. Also provided is cable cutoff wavelength, mode field diameter (in microns) at 1310 μm, zero dispersion wavelength, dB per turn loss (attenuation) increase when bent around a 10 mm diameter mandrel, inner radius of the void-containing ring, outer radius of the void-containing ring, the width of the annular void-containing ring, the regional void area fraction in the annular ring, the total fiber void area percent, the mean void diameter of the voids in the annular region, the standard deviation of the void diameter of the voids in the annular region, the approximate minimum and maximum void diameter of the voids in the annular region, the approximate number of voids in the void-containing annular ring, and the average number density of voids in the annular region. Also set forth in Table 1 are the process parameter Ω, and the ratio of voids in the preform to voids in the resultant fiber. In some preferred embodiments, the ratio of voids in the preform to voids in the resultant fiber is less than 2000, more preferably less than 1800, even more preferably less than 1700, and most preferably less than 1500.

TABLE 1

| | Example | | | | | | | |
|---|---|---|---|---|---|---|---|---|
| | 1 | 2 | 3 | 4 | 5 | 6 | 7 | 8 |
| Void Gas | Kr | Kr | Kr | Kr | $N_2$ | $N_2$ | $N_2$ | $N_2$ |
| Core/Clad Ratio | 0.43 | 0.43 | 0.43 | 0.43 | 0.42 | 0.42 | 0.42 | 0.42 |
| core delta, % | 0.34 | 0.34 | 0.34 | 0.34 | 0.34 | 0.34 | 0.34 | 0.34 |
| % void gas used in consolidation | 100 | 100 | 100 | 100 | 50 | 50 | 50 | 50 |
| Draw furnace element length, diameter in inches | 8, 3.5 | 8, 3.5 | 4, 3.5 | 4, 3.5 | 8, 3.5 | 8, 3.5 | 4, 3.5 | 4, 3.5 |
| Preform diameter, cm | 5.8 | 5.8 | 5.8 | 5.8 | 5.8 | 5.8 | 5.8 | 5.8 |
| Voids in preform | 216000 | 216000 | 216000 | 216000 | 350000 | 350000 | 350000 | 350000 |
| Furnace set point temperature (Tϵ), ° C. | 1985 | 2000 | 2085 | 2100 | 1970 | 2000 | 2070 | 2100 |

TABLE 1-continued

| | | | | | | | | |
|---|---|---|---|---|---|---|---|---|
| Glass softening point (Tσ), °C. | 1630 | 1630 | 1630 | 1630 | 1630 | 1630 | 1630 | 1630 |
| Gas diffusivity at (Tε + Tσ)/2, cm^2/s | 1.60E-09 | 1.66E-09 | 2.01E-09 | 2.08E-09 | 7.75E-09 | 8.30E-09 | 9.72E-09 | 1.04E-08 |
| Fiber draw speed ($V_f$), cm/s | 1000 | 1000 | 1000 | 1000 | 1000 | 1000 | 1000 | 1000 |
| Fiber diameter, microns | 125 | 125 | 125 | 125 | 125 | 125 | 125 | 125 |
| Fiber radius ($R_f$), cm | 0.00625 | 0.00625 | 0.00625 | 0.00625 | 0.00625 | 0.00625 | 0.00625 | 0.00625 |
| fiber draw tension, grams | 250 | 200 | 250 | 200 | 300 | 200 | 300 | 200 |
| Preform root length ($L_{root}$), cm | 30.9 | 30.9 | 25.6 | 25.6 | 30.9 | 30.9 | 25.6 | 25.6 |
| cable cutoff, nm | 1185 | 1198 | 1199 | 1207 | 1212 | 1225 | 1215 | 1231 |
| 1310 MFD, um | 8.42 | 8.24 | 8.35 | 8.26 | 8.44 | 8.35 | 8.47 | 8.52 |
| Lambda zero, nm | 1318 | 1318 | 1318 | 1318 | 1315 | 1315 | 1315 | 1315 |
| dB/Turn @1550 nm 1 × 10 mm dia mandrel | 0.03 | 0.03 | 0.03 | 0.06 | 0.05 | 0.06 | 0.09 | 0.09 |
| Inner radius of void-containing ring in fiber (um) | 9.3 | 9.3 | 9.3 | 9.3 | 10.0 | 10.0 | 10.1 | 10.0 |
| Outer radius of void-containing ring in fiber (um) | 13.1 | 12.8 | 12.9 | 12.9 | 14.9 | 14.9 | 15.1 | 14.9 |
| Ring width in fiber(um) | 3.8 | 3.5 | 3.6 | 3.6 | 4.9 | 4.9 | 5.0 | 4.9 |
| Regional void area fraction in fiber, $\phi_f$ | 0.042 | 0.049 | 0.030 | 0.037 | 0.025 | 0.030 | 0.022 | 0.027 |
| Total fiber void area percent | 0.09 | 0.10 | 0.06 | 0.08 | 0.08 | 0.09 | 0.07 | 0.08 |
| Mean void diameter in fiber (um) | 0.17 | 0.18 | 0.12 | 0.15 | 0.17 | 0.23 | 0.16 | 0.21 |
| Void dia. std dev in fiber (um) | 0.08 | 0.09 | 0.06 | 0.08 | 0.07 | 0.09 | 0.06 | 0.09 |
| Minimum, maximum void dia in fiber (um) | 0.05, 0.45 | 0.05, 0.53 | 0.05, 0.49 | 0.05, 0.42 | 0.05, 0.35 | 0.05, 0.45 | 0.05, 0.32 | 0.05, 0.45 |
| Number of voids in ring of fiber | 399 | 350 | 489 | 416 | 357 | 237 | 399 | 249 |
| Avg. Number density of voids in ring of fiber (voids/um^2) | 1.5 | 1.45 | 1.97 | 1.66 | 0.94 | 0.62 | 1.01 | 0.65 |
| Process parameter, $\Omega$ | 5.28E-08 | 6.48E-08 | 3.97E-08 | 5.09E-08 | 1.53E-07 | 1.96E-07 | 1.41E-07 | 1.85E-07 |
| Ratio (voids in preform/voids in fiber) | 541 | 617 | 442 | 519 | 980 | 1477 | 877 | 1406 |

| | Example | | | | | | | |
|---|---|---|---|---|---|---|---|---|
| | 9 | 10 | 11 | 12 | 13 | 14 | 15 | 16 |
| Void Gas | $N_2$ | $N_2$ | $N_2$ | $N_2$ | $N_2$ | $N_2$ | Kr | Kr |
| Core/Clad Ratio | 0.42 | 0.42 | 0.39 | 0.33 | 0.42 | 0.42 | 0.33 | 0.38 |
| core delta, % | 0.34 | 0.34 | 0.34 | 0.34 | 0.34 | 0.34 | 0.34 | 0.34 |
| % void gas used in consolidation | 30 | 30 | 50 | 100 | 50 | 50 | 100 | 50 |

TABLE 1-continued

| | | | | | | | | |
|---|---|---|---|---|---|---|---|---|
| Draw furnace element length, diameter in inches | 8, 3.8, | 8, 5.0 | 8, 3.5 | 8, 3.5 | 8, 3.5 | 8, 3.5 | 8, 3.5 | 8, 3.5 |
| Preform diameter, cm | 5.8 | 5.8 | 5.8 | 5.8 | 5.8 | 5.8 | 5.8 | 5.8 |
| Voids in preform | 146000 | 110000 | 110000 | 260000 | 105000 | 300000 | 150000 | 200000 |
| Furnace set point temperature (Tε), °C. | 2000 | 2000 | 2000 | 2000 | 2000 | 2000 | 2000 | 1955 |
| Glass softening point (Tσ), °C. | 1630 | 1630 | 1630 | 1630 | 1630 | 1630 | 1630 | 1630 |
| Gas diffusivity at (Tε + Tσ)/2, cm$^2$/s | 8.30E−09 | 8.30E−09 | 8.30E−09 | 8.30E−09 | 8.30E−09 | 8.30E−09 | 1.66E−09 | 1.50E−09 |
| Fiber draw speed ($V_f$), cm/s | 1000 | 2000 | 300 | 1000 | 1000 | 1000 | 1000 | 1000 |
| Fiber diameter, microns | 125 | 125 | 125 | 125 | 125 | 125 | 125 | 125 |
| Fiber radius ($R_f$), cm | 0.00625 | 0.00625 | 0.00625 | 0.00625 | 0.00625 | 0.00625 | 0.00625 | 0.00625 |
| fiber draw tension, grams | 200 | 200 | 200 | 200 | 200 | 200 | 200 | 350 |
| Preform root length ($L_{root}$), cm | 38.6 | 126.0 | 28.0 | 30.9 | 30.9 | 30.9 | 30.9 | 38.6 |
| cable cutoff, nm | 1259 | 1208 | 1141 | 1137 | 1204 | 1164 | 1243 | 1241 |
| 1310 MFD, um | 8.39 | 8.19 | 8.78 | 8.71 | 8.51 | 8.27 | 8.97 | 7.72 |
| Lambda zero, nm | 1315 | 1316 | 1312 | 1340 | 1315 | 1315 | NA | 1315 |
| dB/Turn @1550 nm 1 × 10 mm dia mandrel | 0.04 | 1.37 | 0.05 | 0.11 | 0.44 | 0.06 | 0.09 | 0.09 |
| Inner radius of void-containing ring in fiber (um) | 9.2 | 9.8 | 11.7 | 12.2 | 11.4 | 10.7 | 12.8 | 11.8 |
| Outer radius of void-containing ring in fiber (um) | 13.2 | 13 | 16.2 | 15.6 | 16.1 | 15.2 | 15.5 | 14.9 |
| Ring width in fiber(um) | 4.0 | 3.2 | 4.5 | 3.4 | 4.7 | 4.5 | 2.7 | 3.6 |
| Regional void area fraction in fiber, $\phi_f$ | 0.020 | 0.040 | 0.044 | 0.032 | 0.018 | 0.020 | 0.027 | 0.020 |
| Total fiber void area percent | 0.05 | 0.01 | 0.04 | 0.03 | 0.02 | 0.02 | 0.03 | 0.02 |
| Mean void diameter in fiber (um) | 0.225 | 0.25 | 0.30 | 0.21 | 0.23 | 0.17 | 0.12 | 0.077 |
| Void dia. std dev in fiber (um) | 0.09 | 0.1 | 0.2 | 0.1 | 0.2 | 0.1 | 0.1 | 0.03 |
| Minimum, maximum void dia in fiber (um) | .05, 0.50 | .05, 0.44 | .02, 0.70 | .02, 0.78 | .02, 0.53 | .02, 0.44 | .02, 0.40 | .02, 0.20 |
| Number of voids in ring of fiber | 127 | 59 | 45 | 209 | 148 | 230 | 448 | 1075 |
| Avg. Number density of voids in ring of fiber (voids/um$^2$) | 0.45 | 0.26 | 0.11 | 0.70 | 0.36 | 0.63 | 1.87 | 4.13 |

TABLE 1-continued

| Process parameter, Ω | 1.65E−07 | 5.36E−07 | 8.67E−07 | 2.10E−07 | 1.18E−07 | 1.31E−07 | 3.55E−08 | 2.96E−08 |
|---|---|---|---|---|---|---|---|---|
| Ratio (voids in preform/voids in fiber) | 1150 | 1864 | 2444 | 1244 | 709 | 1304 | 335 | 186 |

The measured attenuation for each of the fibers set forth above in Examples 1-4 of the Table 1 were approximately 0.34 and 0.20 dB/Km at 1310 and 1550 nm, respectively, and cable cutoff of about 1230 nm, thereby making these fibers single moded at wavelengths above 1230 nm. A portion of these fibers were measured for bend performance around a 10 mm diameter mandrel, and the fibers exhibited an increase in attenuation at 1550 nm of about 0.03-0.06 dB/turn, thus demonstrating that attenuation increases of less than 5 dB/turn, and even less than 1 dB/turn, and even less than 0.1 dB/turn around a 10 mm diameter mandrel. FIG. 6 illustrates the core and annular void-containing region of the fiber made in Example 4, and shows a germania doped core having a radius of about 4.5 microns, with an annular ring containing non-periodically located voids therein spaced from core a distance of about 4 microns.

Example 5-8

730 grams of SiO2 (0.4 g/cc density) soot were deposited via OVD onto a fully consolidated 1 meter long×20 nm diameter step index (having an approximate 0.34 percent delta, 0.42 core/clad diameter ratio) solid GeO2-SiO2 core-SiO2 clad void-free core cane, thereby resulting in a preform comprising a consolidated void-free core region which was surrounded by a consolidated void-free silica cladding region which in turn was surrounded by a soot silica region. The soot cladding of this assembly was then sintered as follows. The assembly was first dried for 2 hours in an atmosphere consisting of helium and 3 percent chlorine (all gasses were by volume) at 1100° C. in the upper-zone part of the furnace, followed by down driving at 200 mm/min (corresponding to approximately a 100° C./min temperature increase for the outside of the soot preform during the downdrive process) through a hot zone set at approximately 1500° C. in a 50 percent nitrogen plus 50 percent helium (by volume) sintering atmosphere. The preform assembly was then re-down driven (i.e., a second time) through the hot zone at 100 mm/min (corresponding to approximately a 50° C./min temperature increase for the outside of the soot preform during the downdrive process). The preform assembly was then re-down driven (i.e., a third time) through the hot zone at 50 mm/min (corresponding to approximately a 25° C./min temperature increase for the outside of the soot preform during the downdrive process). The preform assembly was then re-down driven (i.e., a fourth time) through the hot zone at 25 mm/min (corresponding to approximately a 12.5° C./min temperature increase for the outside of the soot preform during the downdrive process), then final sintered at 6 mm/min (approximately 3° C./min heat up rate) in order to sinter the soot into a nitrogen-seeded silica overclad preform. Following each downdrive step, the preform assembly was updriven at 200 mm/min into the upper-zone part of the furnace (which remained set at 1100° C.). The first series of higher downfeed rate were employed to glaze the outside of the optical fiber preform, which facilitates trapping of the gases in the preform. The preform was then placed for 24 hours in an argon purged holding oven set at 1000° C. to outgas any remaining helium from the preform. This preform was then redrawn in an argon atmosphere on a conventional graphite redraw furnace set at approximately 1780° C. into void-free GeO2-SiO2 core, void-free SiO2 clad, nitrogen-seeded silica overclad canes which were 12 mm in diameter and 1 meter long. One of 12 mm canes was placed back in a lathe where 4000 grams of additional SiO2 (0.42 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1100° C. followed by down driving at 6 mm/min through a hot zone set at 1500° C. in a 100% helium (by volume) atmosphere in order to sinter the soot to a germania containing void-free core, silica void-free inner cladding, silica nitrogen-seeded ring (i.e. silica with voids containing nitrogen), and void-free overclad preform. The preform was placed for 24 hours in an argon purged holding oven set at 1000° C. to outgas the helium from the preform. The optical fiber preform was drawn to 10 Km lengths of 125 micron diameter optical fiber having a core radius of about 4.5 microns at 10 m/s at approximately 1900 to 2000° C. in a helium atmosphere on a graphite resistance furnace as described in Example 1. The temperature of the optical preform was controlled by monitoring and controlling the optical fiber tension; the fiber tension was held at one value between 50 to 600 grams during each portion (e.g., 10 Km lengths) of a fiber draw run and is listed in the Table 1. Optical and physical characteristics (including SEM analysis) for these fibers which are shown as Examples 5-8 are also listed in Table 1 above.

Optical properties for Examples 5-8 in Table 1 exhibited an attenuation of approximately 0.34 and 0.20 dB/Km at 1310 and 1550 nm, respectively, and a cable cutoff wavelength of about 1231 nm or less, thereby making these fibers single moded at wavelengths above 1231 nm. A portion of these fibers was measured for bend performance around a 10 mm diameter mandrel, and the fibers exhibited an increase in attenuation at 1550 nm of about 0.05-0.09 dB/turn, thus demonstrating that attenuation increases of even less than 5 dB/turn, and even less than 1 dB/turn, and even less than 0.1 dB/turn around a 10 mm diameter mandrel.

Examples 9-16

The fibers illustrated in Examples 916 were made using processes similar to those described above for examples 1-4 and 5-8, except for the process differences indicated in Table 1. The optical fiber preform was drawn to 10 km lengths of 125 micron diameter optical fiber having a core radius of about 4.5 microns.

Optical properties for Examples 9-16 in Table 1 exhibited an attenuation of about 0.2 dB/km or less at 1550 nm. A portion of these fibers was measured for bend performance around a 10 mm diameter mandrel, and the fibers exhibited an increase in attenuation at 1550 nm of about 0.05-0.09 dB/turn, thus demonstrating that attenuation increases of even less than 5 dB/turn, and even less than 1 dB/turn, and even less than 0.1 dB/turn around a 10 mm diameter mandrel.

Example 17

Approximately 520 grams of $SiO_2$ (0.4 g/cc density) soot were deposited via OVD onto a fully consolidated 1 meter long×20 mm diameter step index (having an approximate 0.34 percent delta, 0.40 core/clad diameter ratio) solid $GeO_2$-$SiO_2$ core-$SiO_2$ clad void-free core cane, thereby resulting in a preform comprising a consolidated void-free core region which was surrounded by a consolidated void-free silica cladding region which in turn was surrounded by a soot silica region. The soot cladding of this assembly was then sintered as follows. The assembly was first dried for 4 hours in an atmosphere consisting of helium and 2 percent CO (all gasses were by volume) at 1240° C. in the upper-zone part of the furnace, followed by down driving at 200 mm/min (corresponding to approximately a 100° C./min temperature increase for the outside of the soot preform during the down-drive process) through a hot zone set at approximately 1500° C. in a 100 percent sulfur dioxide (by volume) sintering atmosphere. The preform assembly was then re-down driven (i.e., a second time) through the hot zone at 100 mm/min (corresponding to approximately a 50° C./min temperature increase for the outside of the soot preform during the down-drive process). The preform assembly was then re-down driven (i.e., a third time) through the hot zone at 50 mm/min (corresponding to approximately a 25° C./min temperature increase for the outside of the soot preform during the down-drive process). The preform assembly was then re-down driven (i.e., a fourth time) through the hot zone at 25 mm/min (corresponding to approximately a 12.5° C./min temperature increase for the outside of the soot preform during the down-drive process), then final sintered at 6 mm/min (approximately 3° C./min heat up rate) in order to sinter the soot into a sulfur dioxide-seeded silica overclad preform. Following each downdrive step, the preform assembly was updriven at 200 mm/min into the upper-zone part of the furnace (which was reset to about at 1200° C.). The first series of higher downfeed rate were employed to glaze the outside of the optical fiber preform, which facilitates trapping of the gases in the preform. The preform was then placed for 24 hours in an argon purged holding oven set at 1000° C. to outgas any remaining helium from the preform. This preform was then redrawn in an argon atmosphere on a conventional graphite redraw furnace set at approximately 1780° C. into void-free $GeO_2$-$SiO_2$ core, void-free $SiO_2$ clad, sulfur dioxide-seeded silica overclad canes which were about 10.6 mm in diameter and 1 meter long. One of 10.6 mm canes was placed back in a lathe where about 4100 grams of additional $SiO_2$ (0.42 g/cc density) soot were deposited via OVD. The soot of this cladding (which may be called overcladding) for this assembly was then sintered as follows. The assembly was first dried for 2 hours in an atmosphere consisting of helium and 3 percent chlorine at 1100° C. followed by down driving at 6 mm/min through a hot zone set at 1500° C. in a 100% helium (by volume) atmosphere in order to sinter the soot to a germania containing void-free core, silica void-free inner cladding, silica sulfur dioxide-seeded ring (i.e. silica with voids containing sulfur dioxide), and void-free overclad preform. The preform was placed for 24 hours in an argon purged holding oven set at 1000° C. to outgas the helium from the preform. The optical fiber preform was drawn to 5 Km lengths of 125 micron diameter optical fiber having a core radius of about 4.5 microns at 10 m/s at approximately 1900 to 2000° C. in a helium atmosphere on a graphite resistance furnace as described in Example 1. The temperature of the optical preform was controlled by monitoring and controlling the optical fiber tension; the fiber tension was held at one value between 50 to 600 grams during each portion (e.g., 5 Km lengths) of a fiber draw run and is listed in the Table 2. Optical and physical characteristics (including SEM analysis) for these fibers are as follows:

TABLE 2

| | Example 17 |
|---|---|
| Void Gas | $SO_2$ |
| Core/Clad Ratio | 0.40 |
| core delta, % | 0.34 |
| % void gas used in consolidation | 100 |
| Draw furnace element length, diameter in inches | 8, 3.5 |
| Preform diameter, cm | 5.8 |
| Voids in preform | 900000 |
| Furnace set point temperature (Tε), ° C. | 1985 |
| Glass softening point (Tσ), ° C. | 1630 |
| Gas diffusivity at (Tε + Tσ)/2, cm^2/s | NA |
| Fiber draw speed ($V_f$), cm/s | 1000 |
| Fiber diameter, microns | 125 |
| Fiber radius ($R_f$), cm | 0.00625 |
| fiber draw tension, grams | 250 |
| Preform root length ($L_{root}$), cm | 30.9 |
| cable cutoff, nm | 1205 |
| 1310 MFD, um | 8.45 |
| Lambda zero, nm | NA |
| dB/Turn @ 1550 nm 1 × 10 mm dia mandrel | .96 |
| Inner radius of void-containing ring in fiber (um) | 10.4 |
| Outer radius of void-containing ring in fiber (um) | 13.8 |
| Ring width in fiber(um) | 3.4 |
| Regional void area fraction in fiber, $\phi_f$ | 0.008 |
| Total fiber void area percent | 0.02 |
| Mean void diameter in fiber (um) | 0.045 |
| Void dia. std dev in fiber (um) | 0.08 |
| Minimum, maximum void dia in fiber (um) | 0.05, 0.12 |
| Number of voids in ring of fiber | 750 |
| Avg. Number density of voids in ring of fiber (voids/um^2) | 3 |
| Process parameter, Ω | NA |
| Ratio (voids in preform/voids in fiber) | 1200 |

Particularly preferred draw parameters were as follows. Higher draw speeds, such as 10 m/s or greater, more preferably 20 m/s or greater and most preferably 25 m/s or greater, resulted in lower Ω. Preferred furnace peak temperature in the examples was between about 1950 and 2100° C. A relatively short draw furnace hot zone was employed, resulting in a preform root length in most cases which was less than 40 cm, more preferably less than 35 cm, and most preferably less than 30 cm, the approximate number of voids (taken in cross section) in a cross section of the optical fiber preform was greater than 100,000, and in some examples was greater than 200,000 and even greater than 300,000. The above examples (except examples 10 and 11) illustrate fiber made using a process parameter $\Omega$ which was less than $5\times10^{-7}$, and in many examples less than $4\times10^{-7}$, and even less than $1\times10^{-7}$. Examples 10 and 11, both of which illustrate fiber made using a process parameter $\Omega$ which was greater than $5\times10^{-7}$, exhibited far fewer voids in the resultant fibers. In the case of Example 10, it is believed that this is due to the extremely long draw root (which resulted in a longer resonance time for coalescence). In the case of Example 11, it is believed that this is due to the slow draw speed (again resulting in a longer resonance time for coalescence).

It should be understood that many of the process parameters described above would likely change for different sized optical fiber preforms. For example, if the preform was enlarged compared to what was employed in the examples, the number of voids would likely increase, as would furnace set point, and draw root length. However, regardless of preform size, it is believed that it is still desirable to maintain process parameter $\Omega$ below $5\times10^{-7}$.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A single mode microstructured optical fiber for transmitting optical signals comprised of light, the optical fiber comprising:
   a void free core region disposed about a longitudinal centerline and having a refractive index profile with a first refractive index, and
   a cladding region surrounding the core region, the cladding region comprising an annular void-containing region comprised of non-periodically disposed voids which comprises a width between 2 and 10 microns, said void-containing region is spaced from the core at least 1 micron by an inner annular void free region, said cladding further comprising an outer void free region which surrounds said void-containing region;
   wherein said non-periodically disposed voids comprise a regional void area percent in said void-containing region which is between 2 and 10 percent, and an average number density of voids in said void-containing region is greater than 1 per microns$^2$, and said fiber exhibits a 22 meter cutoff wavelength less than 1500 nm.

2. The single mode fiber of claim 1, wherein said annular void-containing region comprises a width of between 2 and 10 microns.

3. The single mode fiber of claim 1, wherein said fiber exhibits a 22 meter cutoff wavelength less than 1260 nm.

4. The single mode fiber of claim 1, wherein the average number density of voids in said void-containing region is greater than 2 per microns$^2$.

5. The single mode fiber of claim 1, wherein the void-containing region comprises a void distribution uniformity throughout the circumference and width of the annular void-containing region and along the length of the fiber sufficient to result in a maximum bend loss less than 2 dB per 10 mm diameter turn for an entire fiber length which is greater than 1 m.

6. The single mode fiber of claim 1, wherein said annular void-containing region comprises greater than 200 voids when said fiber is viewed in cross-section.

7. The single mode fiber of claim 1, wherein said annular void-containing region comprises greater than 300 voids when said fiber is viewed in cross-section.

8. The single mode fiber of claim 1, wherein said annular void-containing region comprises greater than 600 voids when said fiber is viewed in cross-section.

9. The fiber of claim 7, wherein said annular region is less than 10 microns in width.

10. The fiber of claim 8, wherein said annular region exhibits a mean diameter void size less than about 300 nm.

11. The fiber of claim 8, wherein said annular region exhibits a mean diameter void size less than about 200 nm and greater than 5 nm.

12. The single mode fiber of claim 1, wherein the voids in said annular void-containing region comprise krypton gas or sulphur dioxide gas or chlorine gas plus at least one of nitrogen, carbon dioxide, argon, krypton or sulphur dioxide.

13. The single mode fiber of claim 10, wherein the voids in said annular void-containing region comprise plus at least one of nitrogen, carbon dioxide, argon, krypton or sulphur dioxide, and chloride in an amount greater than 2000 ppm by weight.

14. The single mode fiber of claim 10, wherein the voids in said annular void-containing region comprise plus at least one of nitrogen, carbon dioxide, argon, krypton or sulphur dioxide, and chloride in an amount greater than 3000 ppm by weight.

15. The single mode fiber of claim 1, wherein the void-containing region comprises a void distribution uniformity throughout the circumference and width of the annular void-containing region and along the length of the fiber sufficient to result in a maximum bend loss less than 1 dB per turn on a 10 mm diameter mandrel.

16. The single mode fiber of claim 1, wherein the void-containing region comprises a void distribution uniformity throughout the circumference and width of the annular void-containing region and along the length of the fiber sufficient to result in a maximum bend loss less than 0.5 dB per turn on a 10 mm diameter mandrel.

17. The single mode fiber of claim 1, wherein the core exhibits a refractive index delta $\Delta_1$, such that $0.3<\Delta_1<0.4$.

* * * * *